(12) United States Patent
Kasslin et al.

(10) Patent No.: US 9,877,328 B2
(45) Date of Patent: Jan. 23, 2018

(54) METHOD, APPARATUS, AND COMPUTER PROGRAM PRODUCT FOR EFFICIENT USE OF FREQUENCY BANDS AND CHANNELS IN WIRELESS ENVIRONMENT

(71) Applicant: Nokia Technologies Oy, Espoo (FI)

(72) Inventors: Mika Kasslin, Espoo (FI); Janne Marin, Espoo (FI)

(73) Assignee: Nokia Technologies Oy, Espoo (FI)

( * ) Notice: Subject to any disclaimer, the term of this patent is extended or adjusted under 35 U.S.C. 154(b) by 94 days.

(21) Appl. No.: 15/040,083

(22) Filed: Feb. 10, 2016

(65) Prior Publication Data

US 2016/0302145 A1 Oct. 13, 2016

Related U.S. Application Data

(60) Provisional application No. 62/144,505, filed on Apr. 8, 2015.

(51) Int. Cl.
| | | |
|---|---|---|
| *H04W 72/04* | (2009.01) | |
| *H04W 48/14* | (2009.01) | |
| *H04W 28/08* | (2009.01) | |
| *H04W 84/12* | (2009.01) | |

(52) U.S. Cl.
CPC ....... *H04W 72/0486* (2013.01); *H04W 28/08* (2013.01); *H04W 48/14* (2013.01); *H04W 84/12* (2013.01)

(58) Field of Classification Search
CPC ...... H04W 28/08; H04W 48/14; H04W 84/12
See application file for complete search history.

(56) References Cited

U.S. PATENT DOCUMENTS

| | | | |
|---|---|---|---|
| 7,203,768 B2 | 4/2007 | Olsen | |
| 8,520,583 B2 | 8/2013 | Kasslin et al. | |
| 2003/0179708 A1* | 9/2003 | Kamerman | H04W 48/12 370/241 |
| 2006/0199586 A1* | 9/2006 | Yoon | H04W 36/12 455/437 |
| 2006/0221919 A1 | 10/2006 | McRae et al. | |
| 2007/0141988 A1 | 6/2007 | Kuehnel et al. | |
| 2008/0316982 A1 | 12/2008 | Murty et al. | |
| 2009/0010399 A1 | 1/2009 | Kim et al. | |

(Continued)

OTHER PUBLICATIONS

Access Network Query Protocol (ANQP) elements, Sec. 8.4.4, Local and Metropolitan Area Networks—Specific Requirements, IEEE 802.11—2012 Standard, pp. 712-726, Mar. 29, 2012.

(Continued)

*Primary Examiner* — Duc C Ho
(74) *Attorney, Agent, or Firm* — Locke Lord LLP

(57) ABSTRACT

A method to provide interoperable mechanisms for efficient use of frequency bands and channels in Wi-Fi networks, including receiving, by an access point device, a wireless request message from a wireless device, requesting information on candidate wireless networks; determining, by the access point device, whether the wireless device is associated with the access point device; and composing, by the access point device, a forwarding message to be transmitted by the access point device to a server, and including in the forwarding message an indication that the wireless device is associated with the access point device, if the wireless device is associated with the access point device.

20 Claims, 15 Drawing Sheets

ACCESS POINT (AP) 110A

500

STEP 502: RECEIVING, BY AN ACCESS POINT DEVICE, A WIRELESS REQUEST MESSAGE FROM A WIRELESS DEVICE, REQUESTING INFORMATION ON CANDIDATE WIRELESS NETWORKS;

STEP 504: DETERMINING, BY THE ACCESS POINT DEVICE, WHETHER THE WIRELESS DEVICE IS ASSOCIATED WITH THE ACCESS POINT DEVICE; AND

STEP 504: COMPOSING, BY THE ACCESS POINT DEVICE, A FORWARDING MESSAGE TO BE TRANSMITTED BY THE ACCESS POINT DEVICE TO A SERVER, AND INCLUDING IN THE FORWARDING MESSAGE AN INDICATION THAT THE WIRELESS DEVICE IS ASSOCIATED WITH THE ACCESS POINT DEVICE, IF THE WIRELESS DEVICE IS ASSOCIATED WITH THE ACCESS POINT DEVICE.

(56) References Cited

U.S. PATENT DOCUMENTS

| | | |
|---|---|---|
| 2009/0245133 A1 | 10/2009 | Gupta et al. |
| 2010/0008285 A1 | 1/2010 | Kuroda |
| 2010/0275249 A1 | 10/2010 | McCann et al. |
| 2010/0313020 A1 | 12/2010 | Montemurro |
| 2014/0112325 A1* | 4/2014 | Calcev ............ H04W 48/16 370/338 |
| 2014/0355523 A1* | 12/2014 | Congdon ......... H04W 48/12 370/328 |
| 2015/0195772 A1* | 7/2015 | Huang ............. H04W 48/14 455/434 |
| 2016/0295485 A1* | 10/2016 | Ponnuswamy ..... H04W 36/245 |
| 2017/0171184 A1* | 6/2017 | Shah ................ H04L 63/08 |

OTHER PUBLICATIONS

WLAN interworking with external networks procedures, Sec. 10.24, Local and Metropolitan Area Networks—Specific Requirements, IEEE 802.11—2012 Standard, pp. 1144-1161, Mar. 29, 2012.

* cited by examiner

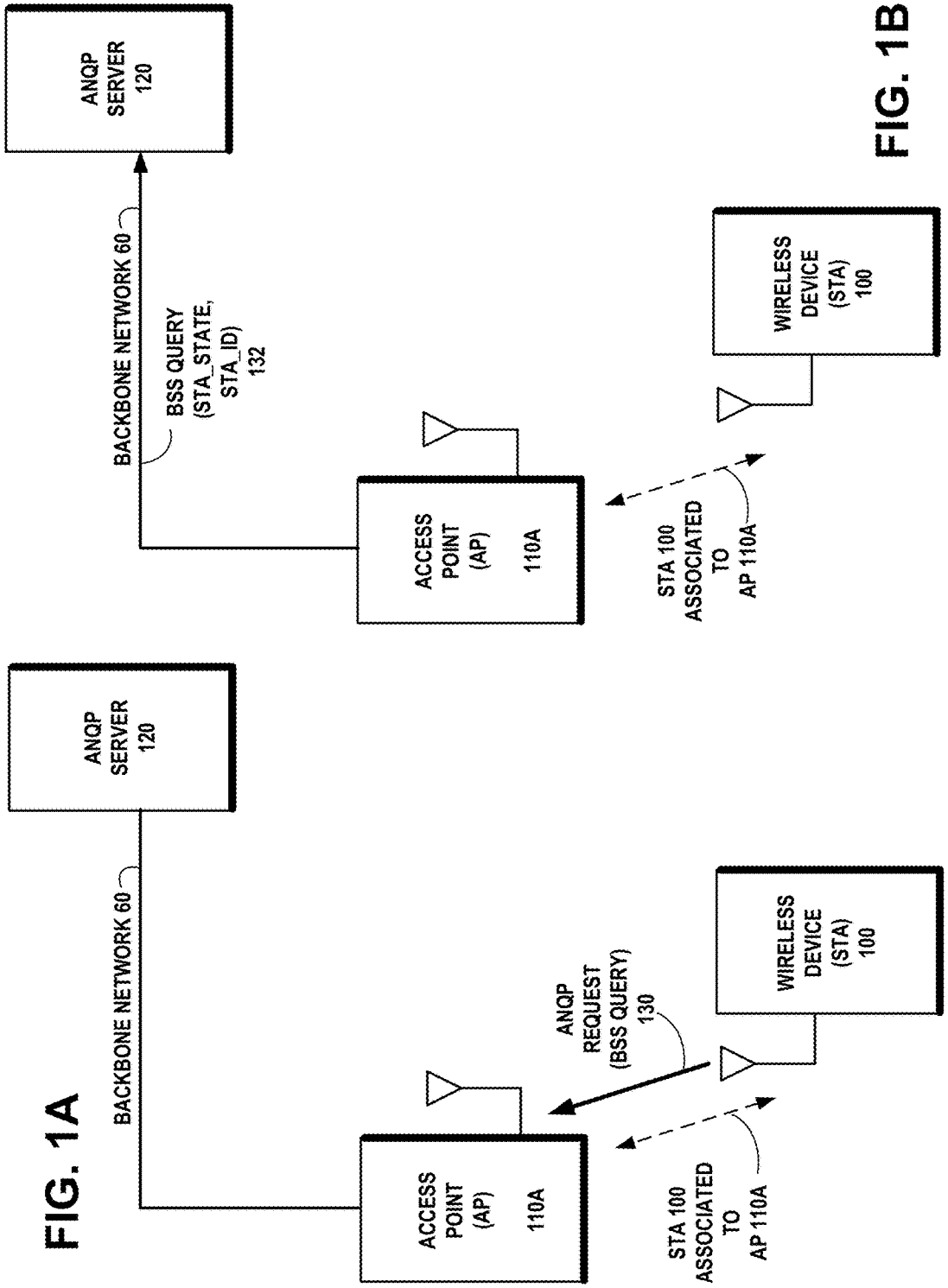

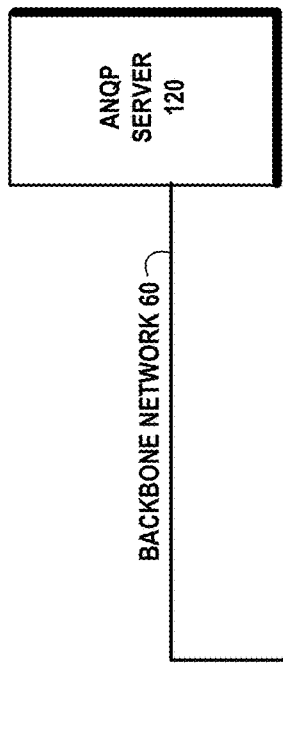
FIG. 1C
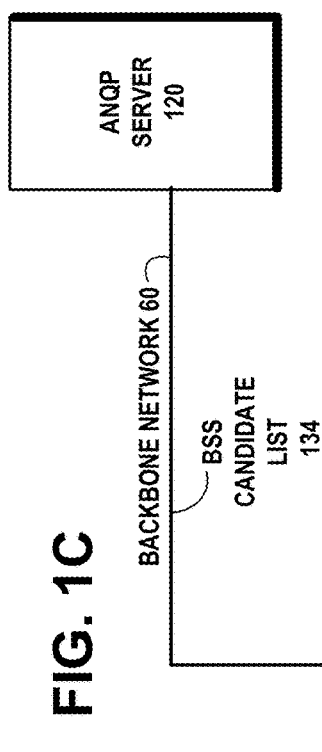
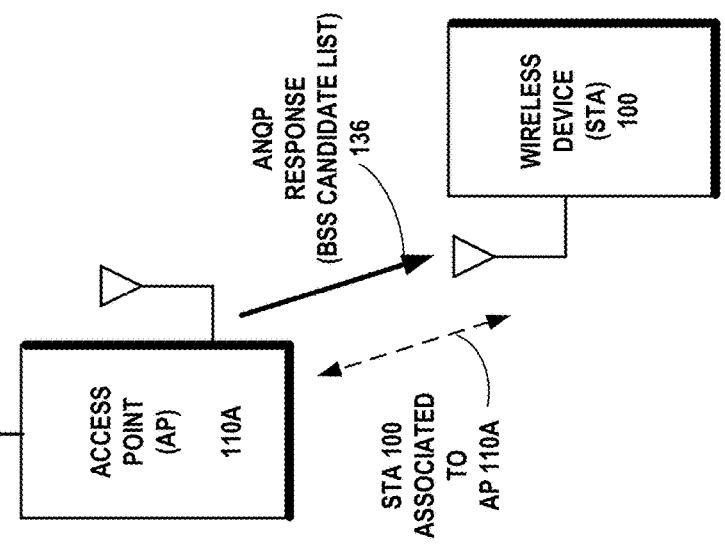
FIG. 1D
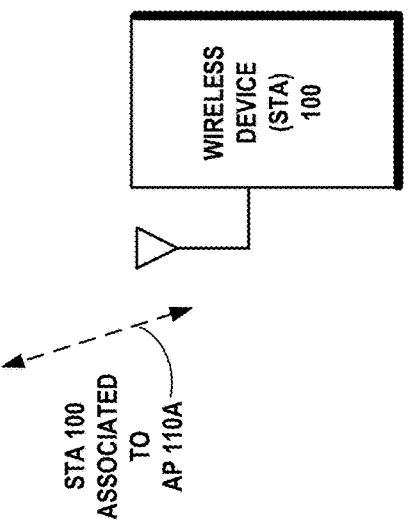

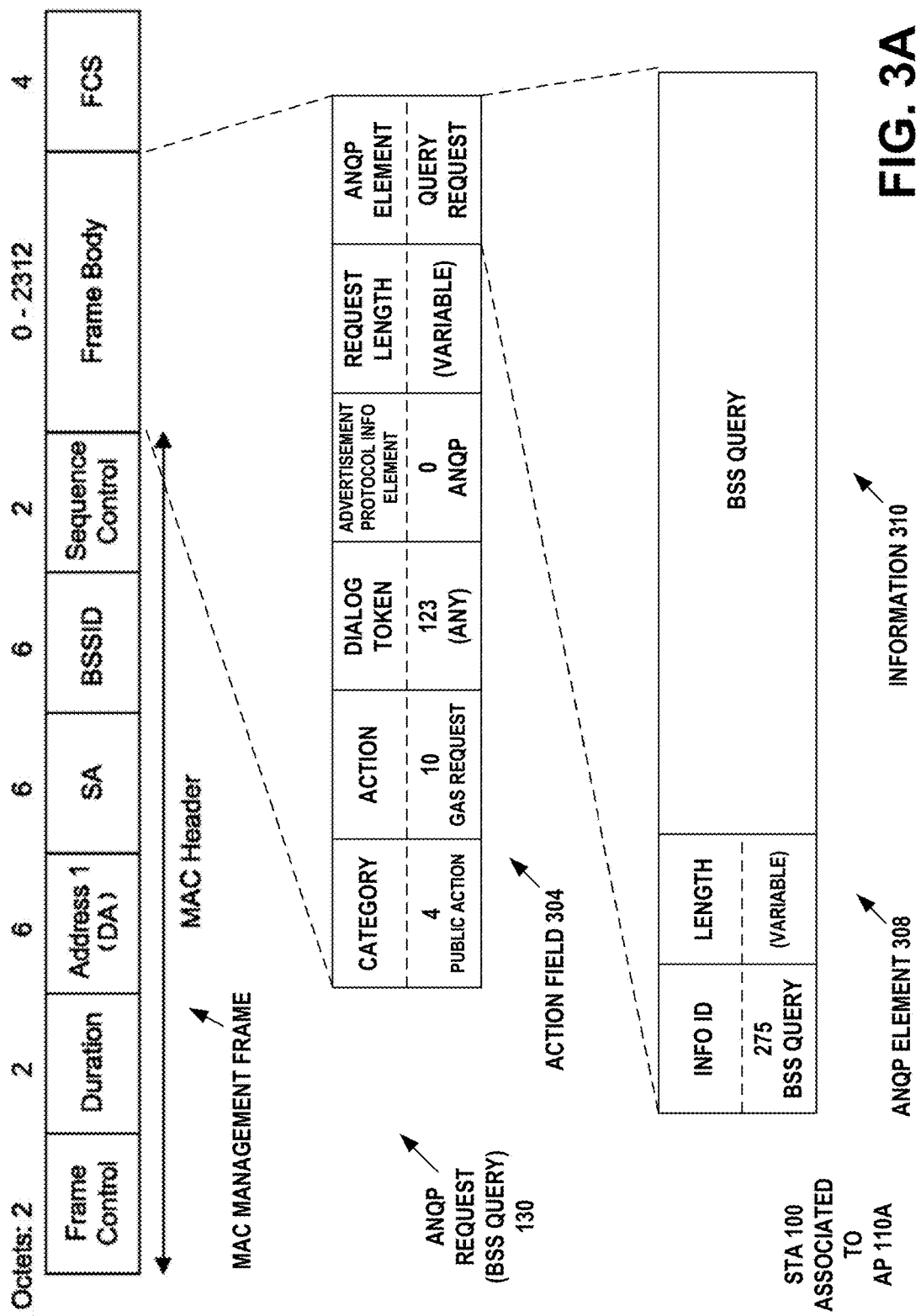

ACCESS POINT (AP) 110A

FIG. 5B

ANQP SERVER 120

550

STEP 552: RECEIVING, BY A SERVER, A FORWARDING MESSAGE FROM AN ACCESS POINT DEVICE, INCLUDING AN INDICATION WHETHER A WIRELESS DEVICE IS ASSOCIATED WITH THE ACCESS POINT DEVICE, THE ACCESS POINT DEVICE HAVING RECEIVED FROM THE WIRELESS DEVICE, A WIRELESS REQUEST MESSAGE REQUESTING INFORMATION ON CANDIDATE WIRELESS NETWORKS;

STEP 554: ACCESSING, BY THE SERVER, INFORMATION ON AVAILABLE WIRELESS NETWORKS IN RESPONSE TO THE FORWARDING MESSAGE, IF THE FORWARDING MESSAGE INCLUDED AN INDICATION THAT THE WIRELESS DEVICE IS ASSOCIATED WITH THE ACCESS POINT DEVICE; AND

STEP 556: TRANSMITTING, BY THE SERVER, A RESPONSE MESSAGE TO THE ACCESS POINT DEVICE, THE RESPONSE MESSAGE INCLUDING IDENTIFICATIONS OF ONE OR MORE CANDIDATE WIRELESS NETWORKS, IN RESPONSE TO THE FORWARDING MESSAGE, IF THE FORWARDING MESSAGE INCLUDED AN INDICATION THAT THE WIRELESS DEVICE IS ASSOCIATED WITH THE ACCESS POINT.

METHOD, APPARATUS, AND COMPUTER PROGRAM PRODUCT FOR EFFICIENT USE OF FREQUENCY BANDS AND CHANNELS IN WIRELESS ENVIRONMENT

The is a non-provisional patent application based on the provisional U.S. Patent Application Ser. No. 62/144,505, filed Apr. 8, 2015, the disclosure of which is being incorporated herein by reference in its entirety.

FIELD

The field of the invention relates to wireless short-range communication and more particularly to provide interoperable mechanisms for efficient use of frequency bands and channels in Wi-Fi networks.

BACKGROUND

Modern society has adopted, and is becoming reliant upon, wireless communication devices for various purposes, such as, connecting users of the wireless communication devices with other users. Wireless communication devices can vary from battery powered handheld devices to household and/or commercial devices utilizing electrical network as a power source. Due to rapid development of the wireless communication devices a number of areas capable of enabling entirely new types of communication applications have emerged.

Cellular networks facilitate communication over large geographic areas. These network technologies have commonly been divided by generations, starting in the late 1970s to early 1980s with first generation (1G) analog cellular telephones that provided baseline voice communications, to modern digital cellular telephones. GSM is an example of a widely employed 2G digital cellular network communicating in the 900 MHZ/1.8 GHZ bands in Europe and at 850 MHz and 1.9 GHZ in the United States. While long-range communication networks, such as GSM, are a well-accepted means for transmitting and receiving data, due to cost, traffic and legislative concerns, these networks may not be appropriate for all data applications.

Short-range communication technologies provide communication solutions that avoid some of the problems seen in large cellular networks. Bluetooth™ is an example of a short-range wireless technology quickly gaining acceptance in the marketplace. In addition to Bluetooth™ other popular short-range communication technologies include Bluetooth™ Low Energy, IEEE 802.11 wireless local area network (WLAN), Wireless USB (WUSB), Ultra Wideband (UWB), ZigBee (IEEE 802.15.4, IEEE 802.15.4a), and ultra-high frequency radio frequency identification (UHF RFID) technologies. All of these wireless communication technologies have features that make them appropriate for various applications.

SUMMARY

Method, apparatus, and computer program product example embodiments provide interoperable mechanisms for efficient use of frequency bands and channels in Wi-Fi networks.

According to an example embodiment of the invention, a method comprises:

receiving, by an access point device, a wireless request message from a wireless device, requesting information on candidate wireless networks;

determining, by the access point device, whether the wireless device is associated with the access point device; and composing, by the access point device, a forwarding message to be transmitted by the access point device to a server, and including in the forwarding message an indication that the wireless device is associated with the access point device, if the wireless device is associated with the access point device.

According to an example embodiment of the invention, a method comprises:

receiving, by the access point device, a response message from the server, the response message including identifications of one or more candidate wireless networks, if the forwarding message included the indication that the wireless device is associated with the access point device; and transmitting, by the access point device to the wireless device, the identifications of one or more candidate wireless networks from the received response message.

According to an example embodiment of the invention, a method comprises:

receiving, by the access point device, a response message from the server, the response message including minimal guidance to possible candidate wireless networks, if the forwarding message does not included an indication that the wireless device is associated with the access point device; and transmitting, by the access point device, information from the received response message, to the wireless device.

According to an example embodiment of the invention, a method comprises:

determining, by the access point device, whether the wireless device is authenticated with the access point device; and including, by the access point device, in the forwarding message, an identification of the wireless device and an indication whether the wireless device is authenticated with the access point device.

According to an example embodiment of the invention, a method comprises:

wherein the server is an access network query protocol server.

According to an example embodiment of the invention, a method comprises:

wherein the forwarding message further includes at least one of a MAC address of the wireless device and a subscription identifier related to the wireless device.

According to an example embodiment of the invention, a method comprises:

wherein the response message includes an indication of which candidate wireless network offers a best wireless connection for the wireless device.

According to an example embodiment of the invention, an apparatus comprises:

at least one processor;

at least one memory including computer program code;

the at least one memory and the computer program code configured to, with the at least one processor, cause the apparatus at least to:

receive a wireless request message from a wireless device, requesting information on candidate wireless networks;

determine whether the wireless device is associated with the apparatus; and compose a forwarding message to be transmitted by the apparatus to a server, and including in the forwarding message an indication that the wireless device is associated with the apparatus, if the wireless device is associated with the apparatus.

According to an example embodiment of the invention, an apparatus comprises:

the at least one memory and the computer program code configured to, with the at least one processor, cause the apparatus at least to:

receive a response message from the server, the response message including identifications of one or more candidate wireless networks, if the forwarding message included the indication that the wireless device is associated with the apparatus; and transmit to the wireless device, the identifications of one or more candidate wireless networks from the received response message.

According to an example embodiment of the invention, a computer program product comprising computer executable program code recorded on a computer readable non-transitory storage medium, the computer executable program code comprising:

code for receiving, by an access point device, a wireless request message from a wireless device, requesting information on candidate wireless networks;

code for determining, by the access point device, whether the wireless device is associated with the access point device; and code for composing, by the access point device, a forwarding message to be transmitted by the access point device to a server, and including in the forwarding message an indication that the wireless device is associated with the access point device, if the wireless device is associated with the access point device.

According to an example embodiment of the invention, a method comprises:

receiving, by a server, a forwarding message from an access point device, including an indication whether a wireless device is associated with the access point device, the access point device having received from the wireless device, a wireless request message requesting information on candidate wireless networks;

accessing, by the server, information on available wireless networks in response to the forwarding message, if the forwarding message included an indication that the wireless device is associated with the access point device; and transmitting, by the server, a response message to the access point device, the response message including identifications of one or more candidate wireless networks, in response to the forwarding message, if the forwarding message included an indication that the wireless device is associated with the apparatus.

According to an example embodiment of the invention, a method comprises:

transmitting, by the server, a response message to the access point, the response message listing candidate networks based on load balancing among the available networks, if the forwarding message included the indication that the wireless device is associated with the access point device.

According to an example embodiment of the invention, a method comprises:

transmitting, by the server, a response message to the access point, the response message including minimal guidance to possible candidate wireless networks, if the forwarding message does not included an indication that the wireless device is associated with the access point device.

According to an example embodiment of the invention, a method comprises:

receiving, by the server, in the forwarding message, an identification of the wireless device and an indication whether the wireless device is authenticated with the access point device.

According to an example embodiment of the invention, a method comprises:

wherein the server is an access network query protocol server.

According to an example embodiment of the invention, a method comprises:

wherein the forwarding message further includes at least one of a MAC address of the wireless device and a subscription identifier related to the wireless device.

According to an example embodiment of the invention, a method comprises:

wherein the response message includes an indication of which candidate wireless network offers a best wireless connection for the wireless device.

According to an example embodiment of the invention, an apparatus comprises:

at least one processor;

at least one memory including computer program code;

the at least one memory and the computer program code configured to, with the at least one processor, cause the device at least to:

receive a forwarding message from an access point device, including an indication whether a wireless device is associated with the access point device, the access point device having received from the wireless device, a wireless request message requesting information on candidate wireless networks;

access information on available wireless networks in response to the forwarding message, if the forwarding message included an indication that the wireless device is associated with the access point device; and transmit a response message to the access point device, the response message including identifications of one or more candidate wireless networks, in response to the forwarding message, if the forwarding message included an indication that the wireless device is associated with the apparatus.

According to an example embodiment of the invention, an apparatus comprises:

the at least one memory and the computer program code configured to, with the at least one processor, cause the device at least to:

transmit a response message to the access point, the response message including identifications of one or more available wireless networks, if the forwarding message included the indication that the wireless device is associated with the access point device.

According to an example embodiment of the invention, a computer program product comprising computer executable program code recorded on a computer readable, non-transitory storage medium, the computer executable program code, when executed by a computer processor, comprising:

code for receiving, by a server, a forwarding message from an access point device, including an indication whether a wireless device is associated with the access point device, the access point device having received from the wireless device, a wireless request message requesting information on candidate wireless networks;

code for accessing, by the server, information on available wireless networks in response to the forwarding message, if the forwarding message included an indication that the wireless device is associated with the access point device; and code for transmitting, by the server, a response message to the access point device, the response message including identifications of one or more candidate wireless networks, in response to the forwarding message, if the forwarding message included an indication that the wireless device is associated with the apparatus.

DESCRIPTION OF THE FIGURES

FIG. 1A illustrates the example wireless network of FIG. 1, wherein a wireless device (STA) is associated to an access point device. The wireless device transmits to the access point device, a wireless ANQP request message that includes a BSS query, requesting information on candidate wireless networks, in accordance with at least one embodiment of the present invention.

FIG. 1B illustrates the example wireless network of FIG. 1A, wherein the access point device determines whether the requesting wireless device is associated and authenticated with the access point device. The access point device composes a BSS query forwarding message that includes information from the ANQP the wireless request message. If the wireless device is associated to and authenticated to the access point device, then the access point will include in the forwarding message, an indication that the wireless device is associated with the access point device. The indication may be the state of the wireless device STA_STATE and the identity of the wireless device STA_ID. The figure shows the access point transmitting the BSS query forwarding message over a backbone network to the ANQP server, and including in the forwarding message the indication that the wireless device is associated with the access point device, in accordance with at least one embodiment of the present invention.

FIG. 1C illustrates the example wireless network of FIG. 1B, wherein the ANQP server accesses information on candidate wireless networks in response to the BSS query forwarding message, if the BSS query forwarding message includes an indication that the wireless device is associated with the access point device. The figure shows the ANQP server transmitting a BSS candidate list response message over a backbone network to the access point device, the BSS candidate list response message including identifications of one or more candidate wireless networks, in response to the BSS query forwarding message, if the BSS query forwarding message included an indication that the wireless device is associated to the access point, in accordance with at least one embodiment of the present invention.

FIG. 1D illustrates the example wireless network of FIG. 1C, wherein the access point device transmits to the wireless device, an ANQP response that includes the BSS candidate list identifying one or more candidate wireless networks, as set forth in the received BSS candidate list response message, in accordance with at least one embodiment of the present invention.

FIG. 3A illustrates an example frame format of the wireless ANQP request message that includes a BSS query originated by the wireless device (STA) that is associated to the access point device, requesting information on candidate wireless networks, in accordance with at least one embodiment of the present invention.

FIG. 5B illustrates an example flow diagram of operational steps in the ANQP server, in accordance with at least one embodiment of the present invention.

DISCUSSION OF EXAMPLE EMBODIMENTS OF THE INVENTION

Figure 1:
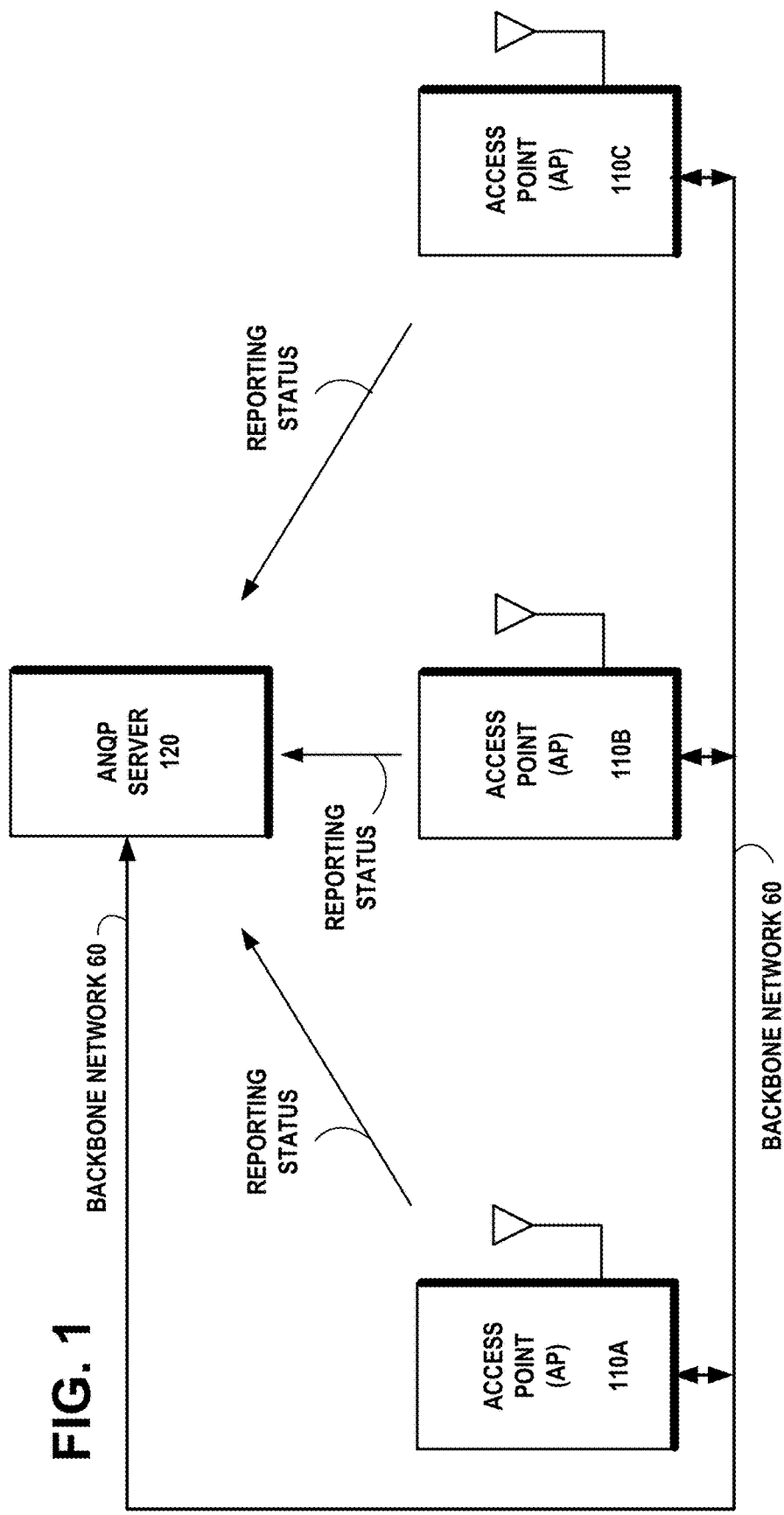
FIG. 1 illustrates an example wireless network of an access network query (ANQP) protocol server that receives status reports from several access point devices over a backbone network, each managing a respective wireless network. Each access point device reports its status to the ANQP server, such as message traffic load, bit error rate, response times, and other performance metrics and services and applications available on its wireless network, which the ANQP server may store for characterizing each available network, in accordance with at least one embodiment of the present invention.

This section is organized into the following topics:
A. WLAN Communication Technology
B. STA Identification and State Information to ANQP Server A. WLAN Communication Technology The IEEE 802.11 standard specifies methods and techniques of an exemplary wireless local area network (WLAN) operation. Examples include the IEEE 802.11b and 802.11g wireless local area network specifications, which have been a staple technology for traditional WLAN applications in the 2.4 GHz ISM band. The various amendments to the IEEE 802.11 standard were consolidated for IEEE 802.11a, b, d, e, g, h, i, j, k, n, r, s, u, v, and z protocols, into the base standard *IEEE 802.11-2012, Wireless Medium Access Control (MAC) and Physical Layer (PHY) Specifications*, February 2012. Since then, emerging broadband applications have stimulated interest in developing very high-speed wireless networks for short range communication, for example, the planned IEEE 802.11ac, and the planned IEEE 802.11ad WLAN specifications that are to provide a very high throughput in various frequency bands. Applications of these IEEE 802.11 standards include products such as consumer electronics, telephones, personal computers, and access points for both for home and office.

1. IEEE 802.11 MAC Frames and Information Elements

There are three major types of medium access control (MAC) frames in the IEEE 802.11 protocol: the management frame, the control frame, and the data frame. Management frames provide management services. Data frames carry payload data. Control frames assist in the delivery of data frames. Each of these types of MAC frame consists of a MAC header, a frame body, and a frame check sequence (FCS). The header contains control information used for defining the type of 802.11 MAC frame and providing information necessary to process the MAC frame. The frame body contains the data or information included in either management type or data type frames. The frame check sequence is a value representing a cyclic redundancy check (CRC) over all the fields of the MAC header and the frame body field.

Management frames are used to provide management services that may be specified by variable-length fields called information elements included in the MAC frame body. An information element includes three fields: its function is identified by an element ID field, its size is provided by a length field, and the information to deliver to the recipient is provided in a variable-length information field.

2. IEEE 802.11 Beacon, Probe Request and Response
a. Beacon

The beacon frame is a management frame that is transmitted periodically to allow wireless devices to locate and identify a network. The beacon frame includes the fields: timestamp, beacon interval, and capability information. The timestamp contains the value of the device's synchronization timer at the time that the frame was transmitted. The capability information field is a 16-bit field that identifies the capabilities of the device. The information elements in a beacon frame are the service set identifier (SSID), the supported rates, one or more physical parameter sets, an optional contention-free parameter set, and an optional traffic indication map.

i. Infrastructure BSS Networks with an Access Point

In an Infrastructure BSS Networks with an Access Point, beacon frames are used for enabling wireless devices to establish and maintain orderly communications. The beacon frames are transmitted by the Access Points at regular intervals and include a frame header and a body with various information, including a Service Set Identifier (SSID) identifying the name of a specific WLAN and a beacon interval specifying the intended time interval between two beacon transmissions. One important purpose of the beacon frames is to inform the wireless devices about the presence of an Access Point in the area. The access point in an infrastructure basic service set (BSS) IEEE 802.11 WLAN network, may be a central hub that relays all communication between the mobile wireless devices (STAs) in an infrastructure BSS. If a STA in an infrastructure BSS wishes to communicate a frame of data to a second STA, the communication may take two hops. First, the originating STA may transfer the frame to the AP. Second, the AP may transfer the frame to the second STA. In an infrastructure BSS, the AP may transmit beacons or respond to probes received from STAs. After a possible authentication of a STA that may be conducted by the AP, an association may occur between the AP and a STA enabling data traffic to be exchanged with the AP. The Access Point in an Infrastructure BSS may bridge traffic out of the BSS onto a distribution network. STAs that are members of the BSS may exchange packets with the AP.

ii. Ad Hoc IBSS Networks

The first ad hoc wireless device to become active establishes an IBSS and starts sending beacons to inform the other wireless devices about the presence of an ad hoc network in the area. Other ad hoc wireless devices may join the network after receiving a beacon and accepting the IBSS parameters, such as the beacon interval, found in the beacon frame.

Each wireless device that joins the ad hoc network may send a beacon periodically if it doesn't hear a beacon from another device within a short random delay period after the beacon is supposed to be sent. If a wireless device doesn't hear a beacon within the random delay period, then the wireless device assumes that no other wireless devices are active in the ad hoc network and a beacon needs to be sent. A beacon signal is periodically transmitted from the ad hoc network. The beacon frame is transmitted periodically and includes the address of the sending device.

b. Probe Request

The probe request frame is a management frame that is transmitted by a wireless device attempting to quickly locate a wireless LAN. It may be used to locate independent basic service sets (IBSSs), infrastructure basic service sets (BSSs) or mesh basic service sets (MBSSs) only or any of them. It may be used to locate a wireless LAN with a particular SSID or to locate any wireless LAN. The probe request frame may contain a service attribute request.

For active scans, the wireless device either broadcasts or unicasts a probe request on the channel it is scanning. It may set the SSID in the probe request to a wildcard SSID or to a specific SSID value. It may set the BSSID in the probe request a wildcard BSSID or to a specific BSSID value. With these options the wireless device can look for any SSID or BSSID, any representative of a specific SSID or a specific BSSID. The wireless device will add any received beacons or probe responses to a cached basic service set identifier (BSSID) scan list. For passive scans, the wireless device does not send a probe request, but instead, listens on a channel for a period of time and adds any received beacons or probe responses to its cached BSSID scan list. The wireless device may scan both infrastructure and ad hoc networks, regardless of the current setting of its network mode. The wireless device may use either the active or passive scanning methods, or a combination of both scanning methods. The wireless device performs the scan across all the frequency channels and bands that it supports.

i. Infrastructure BSS Networks with an Access Point

The wireless device may transmit a probe request and receive a probe response from the access point AP in the BSS. The probe request is transmitted by a wireless device to obtain information from another station or access point. For example, a wireless device may transmit a probe request to determine whether a certain access point is available. In the infrastructure BSS, only the AP responds to probe requests. The probe response sent back by the AP contains a timestamp, beacon interval, and capability information. It also includes the Service Set Identity (SSID) of the BSS, supported rates, and PHY parameters. The wireless device STA may learn that the access point AP will accept the STA's credentials.

The rules applied by the scanning wireless device (i.e. scanner) and the APs with active scanning are as follows:

1) Scanner (for each channel to be scanned):
   a. Transmit a probe request frame (or multiple of thereof) with the SSID and the BSSID fields set as per the scan command;
   b. Reset ProbeTimer to zero and start it upon the probe request transmission;
   c. If nothing is detected (any signal with high enough energy) on the channel before the ProbeTimer reaches MinChannelTime (a.k.a Min_Probe_Response_Time), then go to scan the next channel (if any), else when the ProbeTimer reaches MaxChannelTime (i.e., Max_Probe_Response_Time), process all received probe responses and go to scan the next channel (if any).

2) APs:
   a. An AP shall respond with a probe response only if:
      i. The Address 1 field in the probe request frame is the broadcast address or the specific MAC address of the AP; and
      ii. The SSID in the probe request is the wildcard SSID, the SSID in the probe request is the specific SSID of the AP, or the specific SSID of the AP is included in the SSID list element of the probe request, or the Address 3 field in the probe request is the wildcard BSSID or the BSSID of the AP.
   b. Some further conditions may be set as well for the generation of a probe response.

In general, the probe request transmitter specifies the conditions that wireless devices need to meet in order to respond to with a probe response. All wireless devices that fulfill the condition try to send a probe response frame. The active scanning mechanism defines the signaling.

ii. Ad Hoc IBSS Networks

The effect of receiving a probe request is to cause the wireless device to respond with a probe response if the conditions indicated in the probe request are met. When a wireless device arrives within the communication range of any member of an ad hoc network, its probe request frame inquiry signals are answered by a member of the ad hoc network detecting the inquiry. A device in an ad hoc network that broadcasted the latest beacon in the network responds to the probe request frame inquiry signals with a probe response containing the address of the responding device. The probe response frame also includes the timestamp, beacon interval, capability information, information elements of the SSID, supported rates, one or more physical parameter sets, the optional contention-free parameter set, and the optional ad hoc network parameter set.

Once a device has performed an inquiry that results in one or more ad hoc network descriptions, the device may choose to join one of the ad hoc networks. The joining process may be a purely local process that occurs entirely internal to the wireless device. There may be no indication to the outside world that a device has joined a particular ad hoc network. Joining an ad hoc network may require that all of the wireless device's MAC and physical parameters be synchronized with the desired ad hoc network. To do this, the device may update its timer with the value of the timer from the ad hoc network description, modified by adding the time elapsed since the description was acquired. This will synchronize the timer to the ad hoc network. The BSSID of the ad hoc network may be adopted, as well as the parameters in the capability information field. Once this process is complete, the wireless device has joined the ad hoc network and is ready to begin communicating with the devices in the ad hoc network.

c. Probe Response

The probe response sent back by a wireless device that met the conditions set by the received probe request contains a timestamp, beacon interval, and capability information. It also includes the Service Set Identity (SSID) of the BSS, supported rates, and PHY parameters.

According to an example embodiment, standard spacing intervals are defined in the IEEE 802.11 specification, which delay a station's access to the medium, between the end of the last symbol of the previous frame and the beginning of the first symbol of the next frame. The short interframe space (SIFS), the shortest of the interframe spaces, may allow acknowledgement (ACK) frames and clear to send (CTS) frames to have access to the medium before others. The longer duration distributed coordination function (DCF) interframe space (IFS) or DIFS interval may be used for transmitting data frames and management frames.

According to an example embodiment, after the channel has been released, IEEE 802.11 and before a probe response is transmitted, wireless devices normally employ a spectrum sensing capability during the SIFS interval or DIFS interval, to detect whether the channel is busy. A carrier sensing scheme may be used wherein a node wishing to transmit a probe response has to first listen to the channel for a predetermined amount of time to determine whether or not another node is transmitting on the channel within the wireless range. If the channel is sensed to be idle, then the node may be permitted to begin the transmission process. If the channel is sensed to be busy, then the node may delay its transmission of a probe response for a random period of time called the backoff interval. In the DCF protocol used in IEEE 802.11 networks, the stations, on sensing a channel idle for DIFS interval, may enter the backoff phase with a random value between 0 and CWmin. The backoff counter may be decremented from this selected value as long as the channel is sensed idle for a predetermined time interval. After every received frame one may however wait for a DIFS before sensing the channel status and resuming backoff counter update.

3. Access Network Query Protocol (ANQP)

Access Network Query Protocol (ANQP) is provided by the IEEE 802.11 Standard as an interworking protocol to permit a wireless device to exchange information with an external network, to enable the selection of networks to connect to, and to enable access to emergency services. Access Network Query Protocol (ANQP) is part of Generic Advertisement Service (GAS). Generic Advertisement Service (GAS) is specified to enable mobile wireless devices or STAs to discover the availability of information related to desired network services. For example, the GAS enables discovery of information about services provided in an infrastructure basic service set, information about local access services, information from available Subscription Service Providers (SSP) and/or Subscription Service Provider Networks (SSPNs) or other external networks. GAS enables a wireless device to transmit a generic advertisement service initial request frame to request information about network services from access points and it enables an access point to use a generic container, a GAS initial response frame, to advertise information about network services over an IEEE 802.11 network.

Network discovery may be based on the generic advertising service (GAS) query request and GAS query response exchange that ensures access to a network with the desired characteristics is available to the scanning mobile wireless device (STA). The GAS query protocol enables more comprehensive information discovery and allows the requesting STA to initiate queries to Internet and beyond the responding STA. Network parameters are queried by an access point from an Access Network Query Protocol (ANQP) Server, also referred to herein as a GAS application server, external to the basic service set (BSS) of the access point. The queries are initiated and the response is reported through GAS Query response frame transmitted by the access point and GAS Query response frame received by the STA. GAS Query requests may be broadcast by the STA to a plurality of access points connected to a BSS network and each receiving access point may be required to respond to the STA with a GAS query response. An access point may deliver a received GAS request to the ANQP) Server, which may determine whether the service request can be fulfilled by the network.

A generic advertising service (GAS) query request and GAS query response is delivered in a MAC management frame. The frame body includes an action field that indicates that a GAS query request or GAS response is embedded in the frame body. An advertisement information protocol element field specifies an access network query protocol (ANQP) element.

The Access Network Query Protocol (ANQP) is a query and response protocol that defines services offered by an access point (AP). The ANQP communicates data useful in a mobile device's network selection process, including the IP addresses available at the AP. The ANQP response may include a description of the services available, without the inquiring STA having to join a network. ANQP elements are assigned a unique ANQP Information ID, which defines the response condition of the GAS initial request sent from the mobile wireless device STA, such as ANQP Query List, ANQP Capability List, Network authentication Type information, IP Addresses Type Availability information, etc. The information field of the ANQP elements contains the requested data sent from the access point AP, which may be in one or multiple ANQP info elements.

Network parameters are queried by an access point from an Access Network Query Protocol (ANQP) Server. The ANQP Server may be external to the basic service set (BSS) of the access point. The queries are initiated by a STA to the AP with a GAS Query request frame and are reported by the AP to the STA with a GAS Query response frame. An access point may deliver a received GAS request to the ANQP Server over a backbone network, or optionally over a wireless network, which may determine whether the service request can be fulfilled by the network.

4. BSS Transition Management

BSS transition management is provided by the IEEE 802.11 Standard to enable an AP to request associated STAs to transition to a specific AP, or to indicate to a STA a set of preferred APs, due to network load balancing or BSS Termination. The BSS Transition Management Query frame uses the Action frame body format and is transmitted by a STA requesting or providing information on BSS transition candidate APs. The BSS Transition Management Request frame uses the Action frame body format and is transmitted by an AP STA in response to a BSS Transition Management Query frame, or autonomously. The BSS Transition Management Response frame uses the Action frame body format and is optionally transmitted by a STA in response to a BSS Transition Management Request frame.

The BSS Transition capability enables improved throughput, effective data rate and/or QoS for the aggregate of STAs in a network by shifting (via transition) individual STA traffic loads to more appropriate points of association within the ESS. In addition, the BSS Transition capability provides accounting session control information to a non-AP STA, which might be used to provide an alert to the non-AP STA's user that their session is almost over and the STA will be disassociated from the ESS.

The BSS Transition Management Query, BSS Transition Management Request, BSS Transition Management Response frames provide a means and a protocol to exchange the information needed to enable an AP to inform associated STAs that the BSS will be terminated and to enable a network to manage BSS loads by influencing STA transition decisions. A STA may provide neighbor report information to its associated AP for BSSs that it considers to be transition targets. This information enables the AP to request that the STA transition to a BSS that the STA also prefers.

BSS transition management query: A non-AP STA supporting BSS transition management may request a BSS Transition Candidate list by sending a BSS Transition Management Query frame to its associated AP if the associated AP indicates that it supports the BSS Transition Capability in the Extended Capabilities element. A non-AP STA should include the BSS Transition Candidate List Entries field in the BSS Transition Management Query frame to indicate the non-AP STA's transition preferences. The BSS Transition Candidate List Entries field of a BSS Transition Management Query frame contains zero or more Neighbor Report elements describing the non-AP STA's preferences for target BSS candidates.

BSS transition management request: An AP that supports BSS transition management shall respond to a BSS Transition Management Query frame with a BSS Transition Management Request frame. The AP may send an unsolicited BSS Transition Management Request frame to a non-AP STA at any time if the non-AP STA indicates that it supports the BSS Transition Management capability in the Extended Capabilities element. The AP may transmit a group addressed BSS Transition Management Request frame to associated non-AP STAs if all associated non-AP STAs support the BSS Transition Management capability. When the BSS Transition Management Request frame is transmitted as a group addressed frame, a receiving non-AP STA shall not respond with a BSS Transition Management Response frame. A non-AP STA that supports BSS transition management shall respond to an individually addressed BSS Transition Management Request frame with a BSS Transition Management Response frame.

The AP shall include the BSS Transition Candidate List Entries field in the BSS Transition Management Request frame if the AP has information in response to the BSS Transition Management Query frame. The BSS Transition Candidate List Entries field contains one or more Neighbor Report elements describing the preferences for target BSS candidates. A Preference field value of 0 indicates that the BSS listed is an excluded BSS. The STA should refrain from associating to an AP corresponding to an excluded BSS. The Preference field values are used to establish the relative order of entries within the given list at the given time, and for the given AP.

The values between 1 and 255 provide the indication of order, with 255 indicating the most preferred BSS within the given candidate list, decreasing numbers representing decreasing preference relative only to entries with lower values of the Preference field, and equal numbers representing equal preference. The Preference field value is only valid before the Validity Interval has expired. The AP may include zero or more subelements in the BSS Transition Candidate List Entries field.

Upon successful reception of a BSS Transition Management Query frame or BSS Transition Response frame from a non-AP STA that contains a nonempty BSS Transition Candidate List Entries field, the AP should include at least one BSS candidate from that list with a nonzero Preference field value in the BSS Transition Candidate List Entries field of any subsequent BSS Transition Management Request frame with the Preferred Candidate List Included field set to 1 transmitted to the non-AP STA. The AP shall evaluate the BSSs indicated in the BSS Transition Candidate List Entries field in the latest BSS Transition Management Query frame or BSS Transition Management Response frame received from the non-AP STA as BSS transition candidate(s) for the non-AP STA. The means by which the AP evaluates and determines BSS transition candidates is outside the scope of this specification.

A non-AP STA that receives the Abridged bit with a value of 1 shall treat any BSSID in the current ESS that does not appear in the BSS Transition Candidate List as if it were present in the BSS Transition Candidate List with a Preference value of 0.

B. STA Identification and State Information to ANQP Server

When an access point receives a query from an associated and authenticated STA for information on candidate wireless networks, the existing IEEE 802.11 standard does not enable the AP to forward the query as an ANQP query to an ANQP server, but instead, provides the alternative BSS Transition Management Query as the protocol for such use. The Standard provides the ANQP query for use by an access point to forward queries only from unassociated STAs.

The problem with the ANQP based approach is that it is designed for cases in which a requesting STA is in the unassociated/unauthenticated state. When an AP receives an ANQP request from a STA, it passes the request to the ANQP server to which it is connected and the ANQP server processes the request assuming that the STA is in the unassociated/unauthenticated state. Typically service request processing depends on whether the request originates from a reliable source (authenticated/associated STA) or from an unknown/unreliable source (unauthenticated/unassociated STA). This is also case with BSS selection requests. On the other hand, the objective is to have means to give one and same guidance on BSS selection to an authenticated and associated STA regardless of whether the STA uses the ANQP based protocol or the BSS Transition Management protocol.

It would be beneficial to have the same type of ANQP query and ANQP response for both associated STAs, as well as unassociated STAs.

In accordance with an example embodiment of the invention, when an AP receives from an associated and authenticated STA, an ANQP request that relates to candidate wireless networks, the AP forwards a BSS candidate query to the ANQP server and indicates to the server that the request is originated by an authenticated and associated STA. The AP may also provide further detailed information about the originating STA, such as the MAC address of the STA, or a subscription identifier related to the originating STA.

In accordance with an example embodiment of the invention, when an ANQP server that receives from the AP, the BSS candidate query on candidate wireless networks, the ANQP server checks whether the query contains information about the state, and optionally the identification, of the STA that originated the query. Those BSS candidate queries that indicate that they are originated by associated/authenticated STAs, are processed separately from other BSS candidate queries that indicate that they are originated by unassociated/unauthenticated STAs. If there is no indication on the state in the BSS candidate query, the query is processed as if the query were originated by an unassociated/unauthenticated STA.

FIG. 1 illustrates an example wireless network of an access network query (ANQP) protocol server 120 that receives status reports from several wireless access point devices 110A, 110B, and 110C, each managing a respective wireless network. Each access point device reports its status to the ANQP server, such as message traffic load, bit error rate, response times, and other performance metrics and services and applications available on its wireless network, which the ANQP server may store for characterizing each available network, in accordance with at least one embodiment of the present invention. Additionally, the ANQP server maintains information on location of each access point device or at least their relative position with respect to each other, in order to determine which access point devices are neighbors to each other. The ANQP server may use all this information about characteristics and relative positions of each available network, when giving guidance on BSS selection in the form of candidate wireless networks, in accordance with at least one embodiment of the present invention.

FIG. 1A illustrates the example wireless network of FIG. 1, wherein a wireless device (STA) 100 is associated to an access point device 110A. The wireless device transmits to the access point device, a wireless ANQP request message 130 that includes a BSS query, requesting information on candidate wireless networks, in accordance with at least one embodiment of the present invention. An example of the wireless ANQP request message 130 is shown in greater detail in FIG. 3A.

FIG. 1B illustrates the example wireless network of FIG. 1A, wherein the access point device 110A determines whether the requesting wireless device 100 is associated and authenticated with the access point device. The access point device composes a BSS query forwarding message 132 that includes information from the ANQP wireless request message 130. If the wireless device 100 is associated to and authenticated to the access point device 110A, then the access point will include in the forwarding message 132, an indication that the wireless device is associated with the access point device. The indication may be the state of the wireless device STA_STATE and the identity of the wireless device STA_ID. The figure shows the access point 110A transmitting the BSS query forwarding message 132 to the ANQP server 120 over the backbone network 60, and including in the forwarding message the indication that the wireless device is associated with the access point device, in accordance with at least one embodiment of the present invention. The AP may also provide further detailed information about the originating STA, such as the MAC address of the STA, or a subscription identifier related to the originating STA. An example of the backbone network frame for the BSS query forwarding message 132 is shown in greater detail in FIG. 3B.

In an example embodiment of the invention, a BSS candidate query 132 from an AP to the ANQP server 120 has an optional element/set of fields, which are present in the message 132 only when the BSS candidate query is transmitted due to an ANQP query related to BSS selection received from an associated/authenticated STA. On default all ANQP queries 130 transmitted to an AP by a STA that has no association/authentication relationship to the AP, are assumed by the ANQP server 120 to be unassociated. Thus, a BSS candidate query 132 that has no element/set of fields that are to indicate the STA state and optionally identity, means that the query 132 is due to a request from an unassociated/unauthenticated STA.

FIG. 1C illustrates the example wireless network of FIG. 1B, wherein the ANQP server 120 accesses information on candidate wireless networks in response to the BSS query forwarding message 132, if the BSS query forwarding message 132 includes an indication that the wireless device 100 is associated with the access point device 110A. The figure shows the ANQP server 120 transmitting a BSS candidate list response message 134 over the backbone network 60 to the access point device 110A, the BSS candidate list response message 134 including identifications of one or more candidate wireless networks, in response to the BSS query forwarding message 132, if the BSS query forwarding message 132 included an indication that the wireless device 100 is associated to the access point 110A, in accordance with at least one embodiment of the present invention. An example of the backbone network frame for the BSS candidate list response message 134 is shown in greater detail in FIG. 3C.

An ANQP server 120 processes BSS candidate queries 132 from associated/authenticated STAs separately and differently from those that are from unassociated/unauthenticated STAs:

a. Queries from associated/authenticated STAs are always processed first and with higher priority than queries from unassociated/unauthenticated STAs. In an example embodiment of the invention, a query from an associated/authenticated STA is always processed before any queries from unassociated/unauthenticated STAs. Reception of a query from an associated/authenticated STA puts any processing on queries from unassociated/unauthenticated STAs on hold.

b. Associated/authenticated STAs are provided BSS candidates that offer the most suitable (i.e. best) wireless connection and QoE for the STA. For unassociated/unauthenticated STAs the ANQP server 120 provides those BSSs that provide basic connectivity and that may be dedicated BSSs for initial connection setup. The ANQP server 120 has quite detailed knowledge about the services and applications an associated/authenticated STA runs over the Wi-Fi connection and can thus determine which of the available BSSs are the most suitable for the STA and its services and applications. One may, as an example, estimate bit rate and delay requirements and compare them against estimated performance with each available BSS. Additionally, one may consider load of each available BSS when forming the BSS candidate list that the server will finally send to the AP for further delivery to the originating STA. In an example embodiment of the invention, the AP 110A provides service/application level information (e.g. service/application type, bit rate requirements, delay requirements) to the ANQP server 120 in a BSS candidate query related to an associated/authenticated STA. In case of a query related to an unassociated/unauthenticated STA, the network has no knowledge about the service/application or its requirements on the connectivity and thus the ANQP server 120 has no means to consider them when forming the list of BSS candidates. One may have reserved some dedicated BSSs for initial connection setup phase or alternatively one may use a strategy to guide new STAs to the BSSs, in which they are estimated to have the least effect on the existing connections. In an example embodiment of the invention, the server may transmit a response message 134 to the access point, listing candidate networks based on network load balancing among the candidate networks, if the forwarding message 132 included the indication that the wireless device is associated with the access point device.

FIG. 1D illustrates the example wireless network of FIG. 1C, wherein the access point device 110A transmits to the wireless device, an ANQP response 136 that includes the BSS candidate list identifying one or more candidate wireless networks, as set forth in the received BSS candidate list response message 134, in accordance with at least one embodiment of the present invention. The wireless device 100 may then select one of the listed candidate wireless networks for reassociation, based on their available services, applications, proximity, operating band, or other characteristics. An example of the ANQP response 136 is shown in greater detail in FIG. 3D.

Figure 2A:
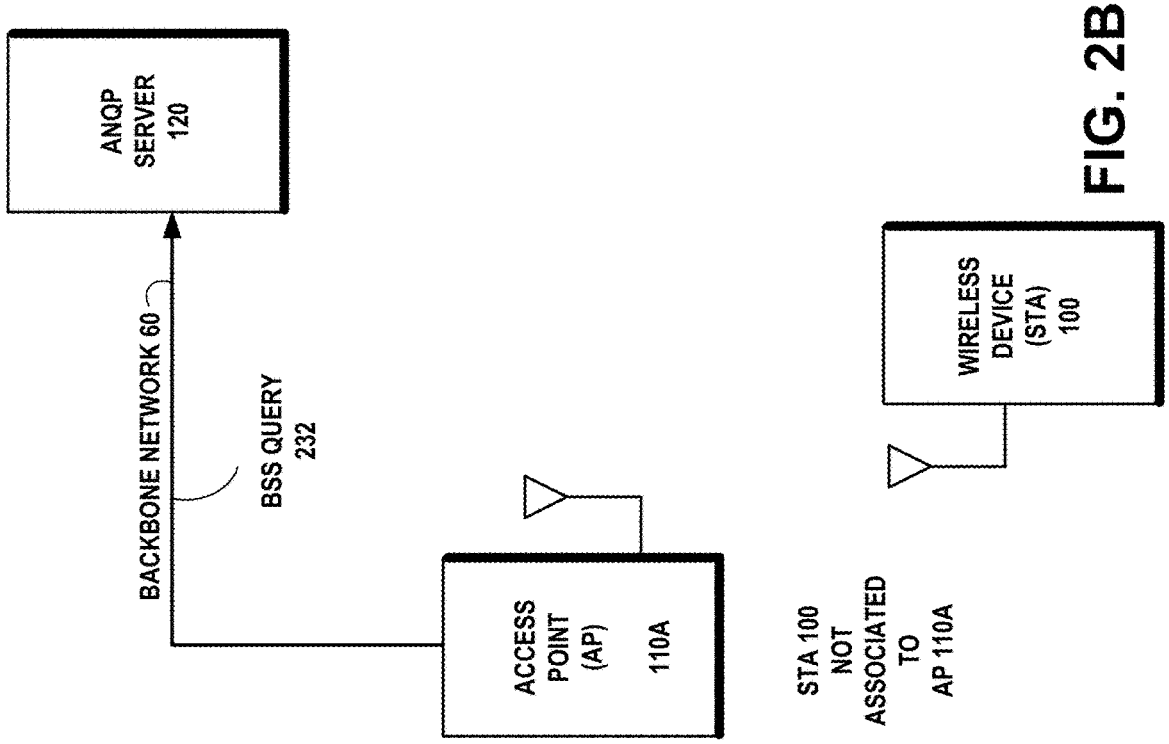
FIG. 2A illustrates the example wireless network of FIG. 1, wherein a wireless device (STA) is not associated to an access point device. The wireless device transmits to the access point device, a wireless ANQP request message that includes a BSS query, requesting information on candidate wireless networks, in accordance with at least one embodiment of the present invention.

FIG. 2A illustrates the example wireless network of FIG. 1, wherein a wireless device (STA) 100 is not associated to an access point device 110A. The wireless device transmits to the access point device, a wireless ANQP request message 230 that includes a BSS query, requesting information on candidate wireless networks, in accordance with at least one embodiment of the present invention. An example of the ANQP request message 230 is shown in greater detail in FIG. 4A. Note that the format of the ANQP request message 230 is the same as the format for the ANQP request message 130 of FIG. 3A, so that the same type of ANQP query is used for both associated STAs, as well as unassociated STAs.

Figure 2B:
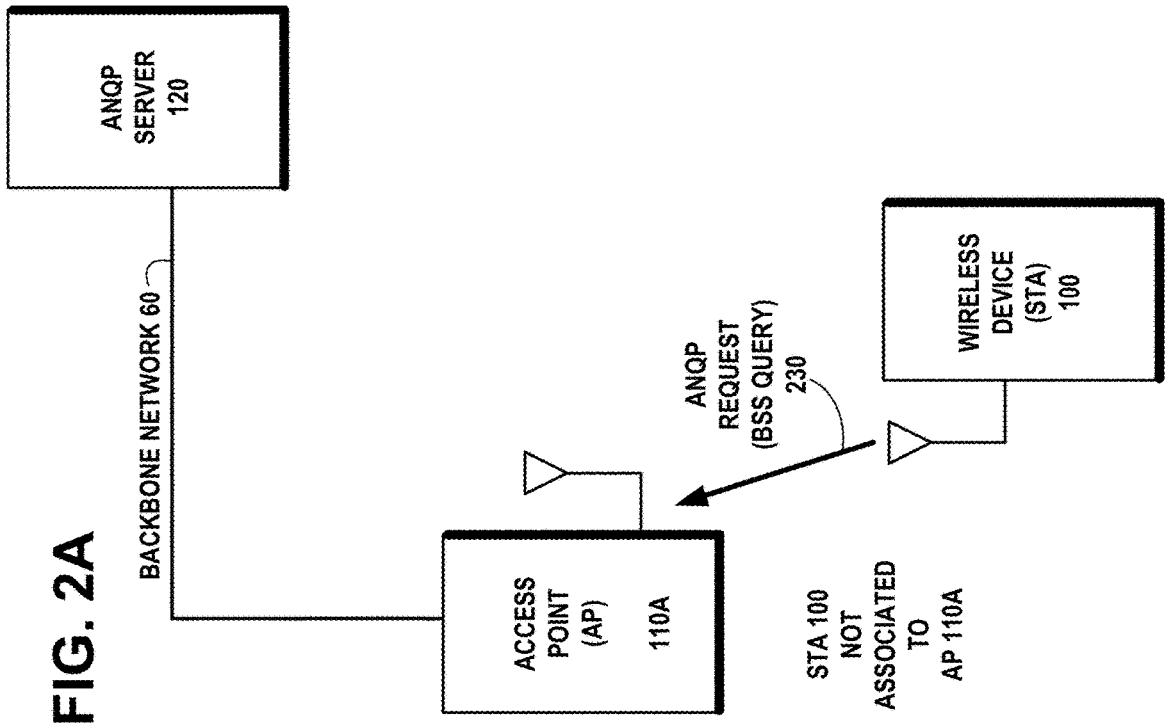
FIG. 2B illustrates the example wireless network of FIG. 2A, wherein the access point device determines that the requesting wireless device is not associated and authenticated with the access point device. The access point device composes a BSS query forwarding message that does not include any indication of whether the wireless device is or is not associated with the access point. The figure shows the access point transmitting the BSS query forwarding message over a backbone network to the ANQP server, without any indication of whether the wireless device is or is not associated with the access point, in accordance with at least one embodiment of the present invention.

FIG. 2B illustrates the example wireless network of FIG. 2A, wherein the access point device 110A determines that the requesting wireless device 100 is not associated and authenticated with the access point device. The access point device composes a BSS query forwarding message 232 that does not include any indication of whether the wireless device 100 is or is not associated with the access point 110A. The figure shows the access point transmitting the BSS query forwarding message 232 over the backbone network 60 to the ANQP server 120, without any indication of whether the wireless device is or is not associated with the access point, in accordance with at least one embodiment of the present invention.

Figure 2D:
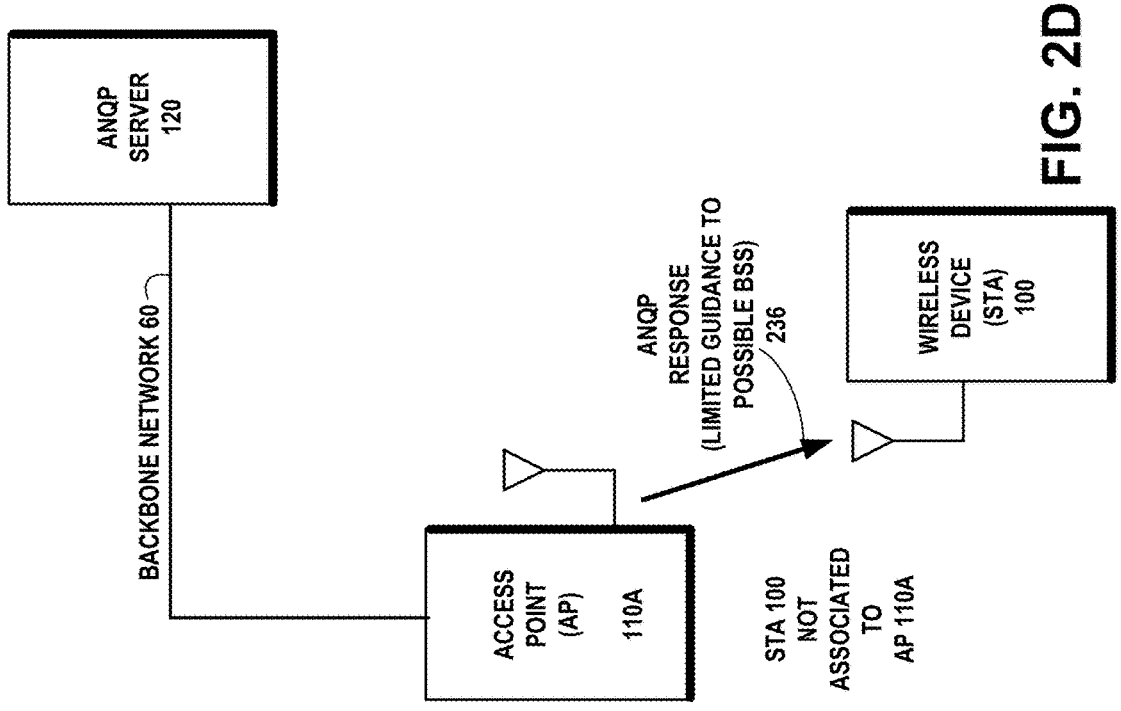
FIG. 2D illustrates the example wireless network of FIG. 2C, wherein the access point device transmits to the wireless device, an ANQP response that includes the minimal or limited guidance to possible BSS message concerning candidate wireless networks, as set forth in the received BSS candidate list response message, in accordance with at least one embodiment of the present invention.
Figure 2C:
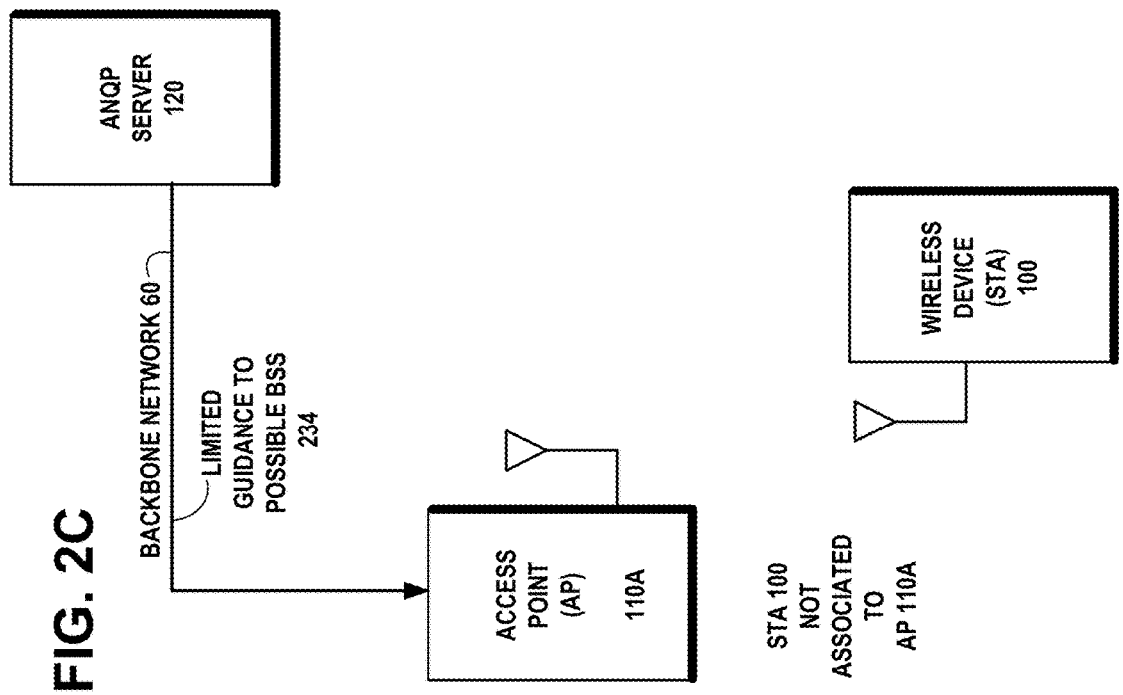
FIG. 2C illustrates the example wireless network of FIG. 2B, wherein the ANQP server receives the BSS query forwarding message and does not read any indication of whether the wireless device is or is not associated with the access point. Without any such indication, the ANQP server assumes that the wireless device is not associated with the access point, and thus processes the request accordingly. The ANQP server transmits to the access point over a backbone network, a minimal or limited guidance to possible BSS message concerning candidate wireless networks, in accordance with at least one embodiment of the present invention.

FIG. 2C illustrates the example wireless network of FIG. 2B, wherein the ANQP server 120 receives the BSS query forwarding message 232 and does not read any indication of whether the wireless device is or is not associated with the access point. Without any such indication, the ANQP server 120 assumes that the wireless device 100 is not associated with the access point 110A, and thus processes the request accordingly. The ANQP server 120 transmits to the access point over the backbone network 60, a minimal or limited guidance to possible BSS message 234 concerning candidate wireless networks, in accordance with at least one embodiment of the present invention. For unassociated/unauthenticated STAs the ANQP server 120 provides those candidate BSSs that provide basic connectivity and that may be dedicated BSSs for initial connection setup.

FIG. 2D illustrates the example wireless network of FIG. 2C, wherein the access point device 110A transmits to the wireless device 100, an ANQP response 236 that includes the minimal or limited guidance to possible BSS message concerning candidate wireless networks, as set forth in the received response message 234, in accordance with at least one embodiment of the present invention. An example of the ANQP response 236 is shown in greater detail in FIG. 4D. Note that the format of the ANQP response message 236 is the same as the format for the ANQP request message 136 of FIG. 3D, so that the same type of ANQP response is used for both associated STAs, as well as unassociated STAs.

FIG. 3A illustrates an example frame format of the wireless ANQP request message 130 that includes a BSS query originated by the wireless device (STA) that is associated to the access point device, requesting information on candidate wireless networks, in accordance with at least one embodiment of the present invention. The information field 130 of the ANQP elements contains the requested data sent from the access point AP. The BSS Query is located in the information field 310 of the ANQP element 308, in the action field 304 of the frame body of the MAC management frame.

Figure 3B:
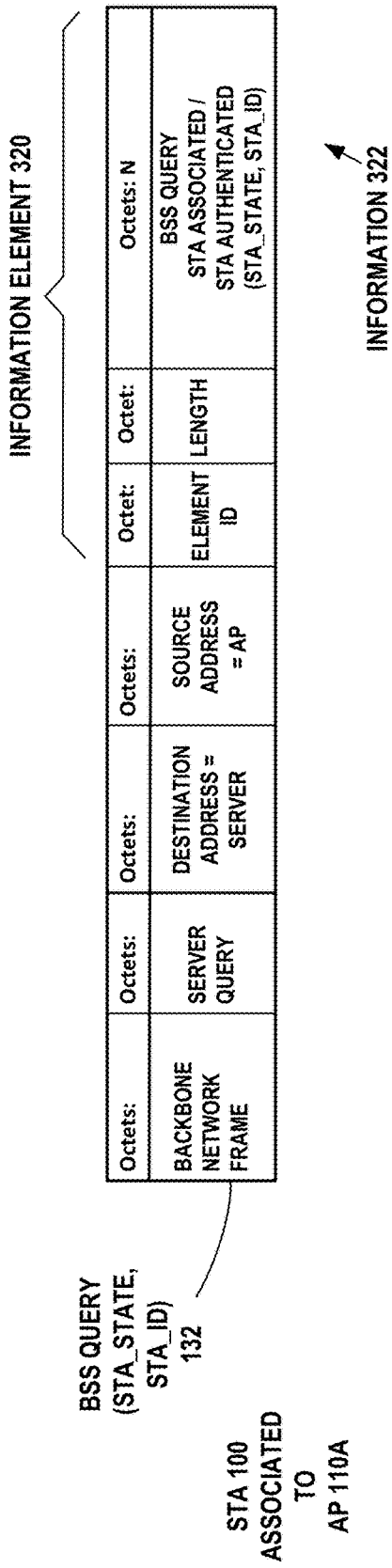
FIG. 3B illustrates an example frame format of the backbone network frame for the BSS query forwarding message transmitted by the access point transmitting the to the ANQP server, including the indication that the wireless device is associated with the access point device and the BSS query originated by the wireless device, in accordance with at least one embodiment of the present invention.

FIG. 3B illustrates an example frame format of the backbone network frame for the BSS query forwarding message 132 transmitted by the access point to the ANQP server, including the indication that the wireless device is associated with the access point device and the BSS query originated by the wireless device, in accordance with at least one embodiment of the present invention. The indication that the wireless device is associated with the access point device, is the information 322 located in the information element 320 of the frame. The information 322 includes the BSS query, the indication of the state that the STA is associated and authenticated to the access point, and the ID of the STA.

Figure 3C:
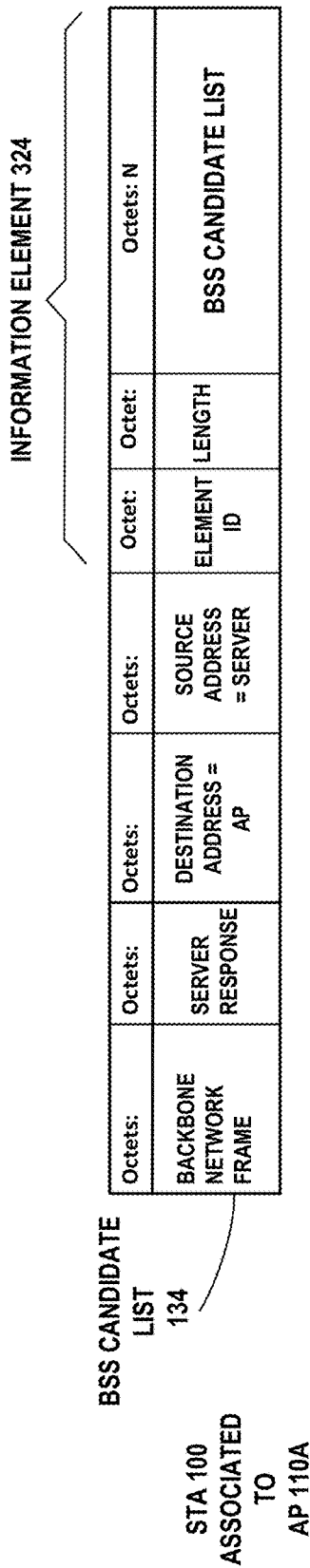
FIG. 3C illustrates an example frame format of the backbone network frame for the BSS candidate list response message transmitted by the ANQP server to the access point device, in response to the BSS query originated by the wireless device (STA) that is associated to the access point device, in accordance with at least one embodiment of the present invention.

FIG. 3C illustrates an example frame format of the backbone network frame for the BSS candidate list response message 132 transmitted by the ANQP server to the access point device, in response to the BSS query originated by the wireless device (STA) that is associated to the access point device, in accordance with at least one embodiment of the present invention. The BSS candidate list, is the information 326 located in the information element 324 of the frame.

Figure 3D:
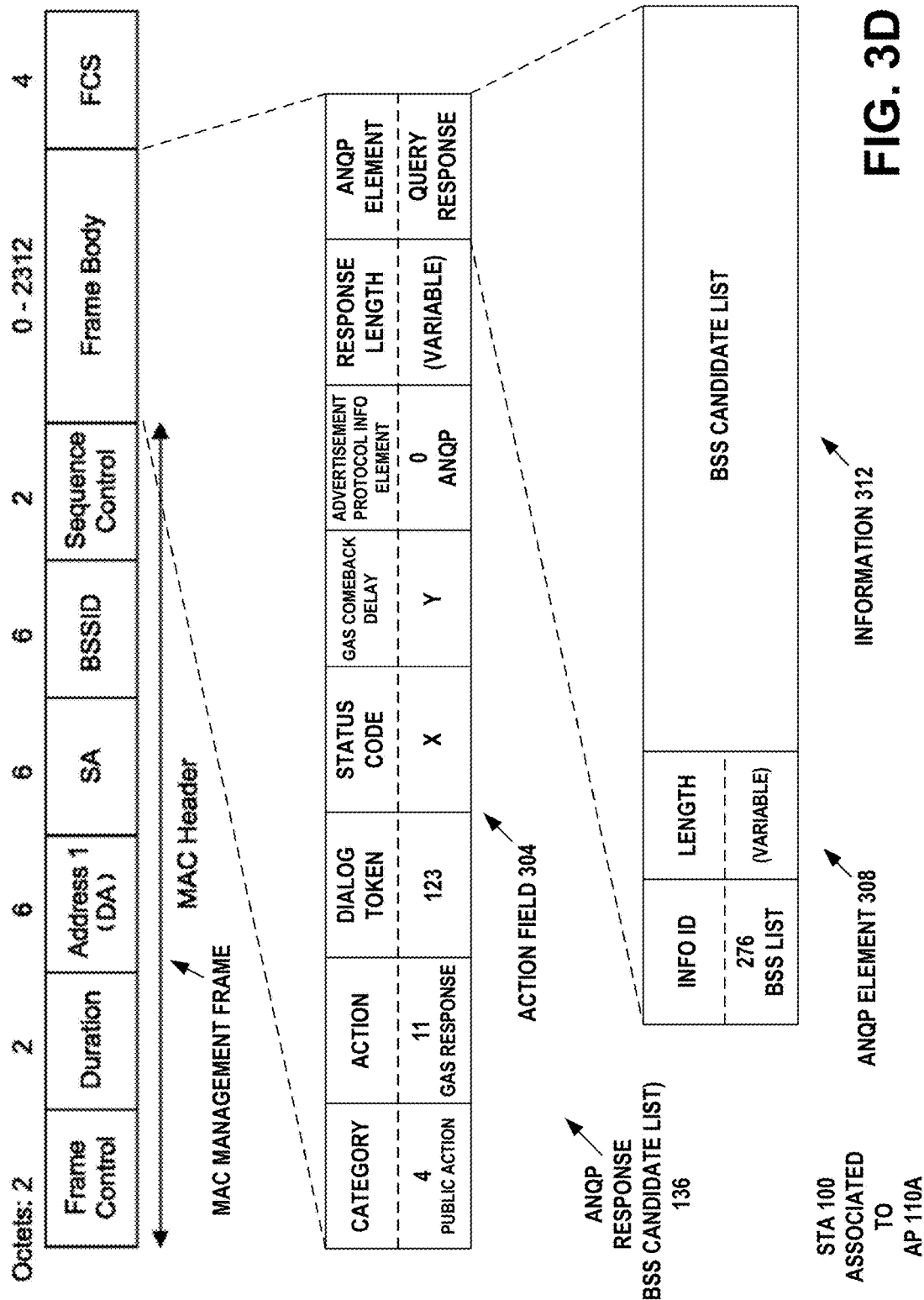
FIG. 3D illustrates an example frame format of the wireless ANQP response message that includes the BSS candidate list identifying one or more candidate wireless networks, in response to the BSS query originated by the wireless device (STA) that is associated to the access point device, in accordance with at least one embodiment of the present invention.

FIG. 3D illustrates an example frame format of the wireless ANQP response message 136 that includes the BSS candidate list identifying one or more candidate wireless networks, in response to the BSS query originated by the wireless device (STA) that is associated to the access point device, in accordance with at least one embodiment of the present invention. The ANQP response 136 may include a description of the services available, without the inquiring STA having to join a network. The BSS Candidate List is located in the information field 310 of the ANQP element 308, in the action field 304 of the frame body of the MAC management frame.

Figure 4A:
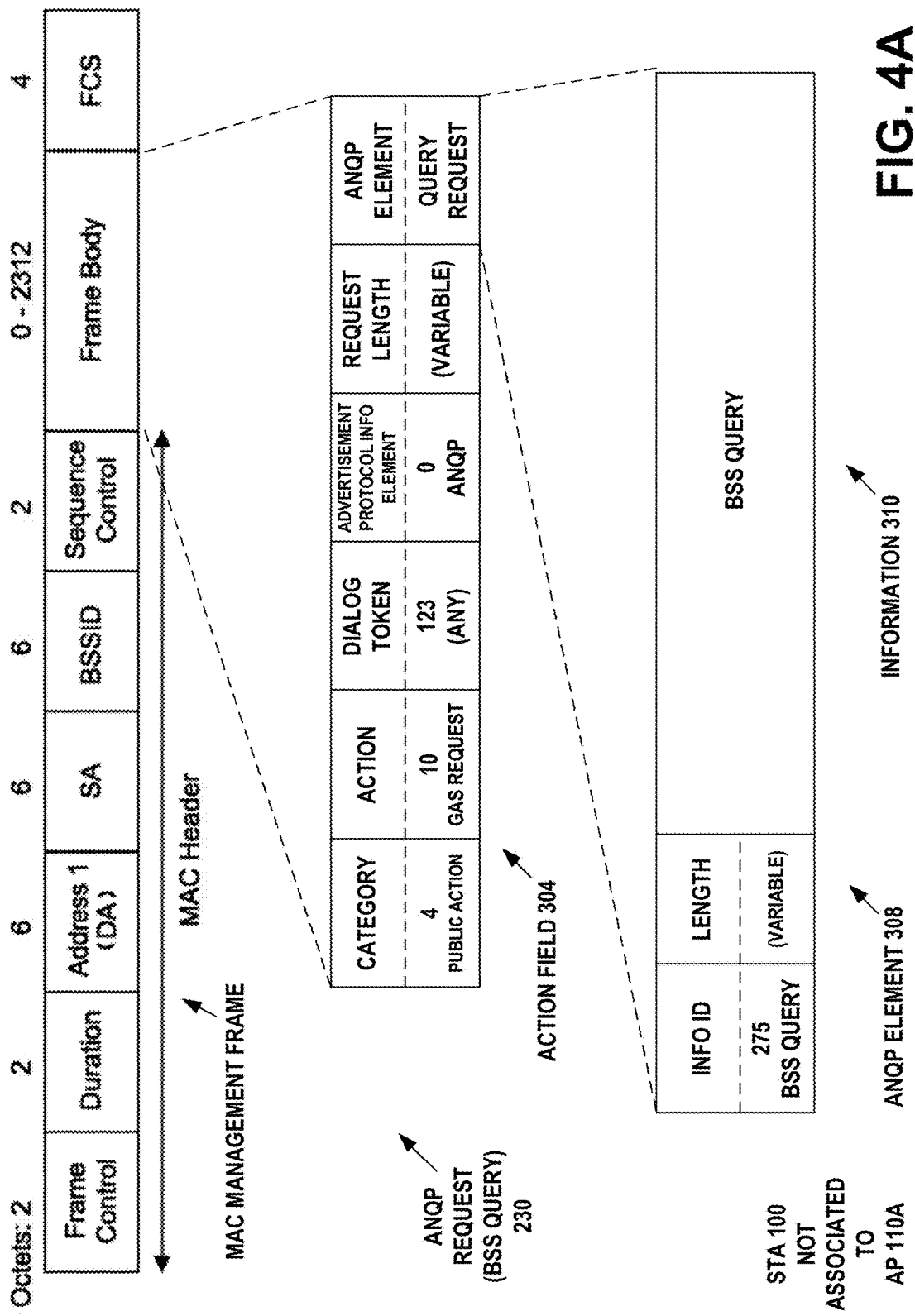
FIG. 4A illustrates an example frame format of the wireless ANQP request message that includes a BSS query originated by the wireless device (STA) that is unassociated to the access point device, requesting information on candidate wireless networks, in accordance with at least one embodiment of the present invention.

FIG. 4A illustrates an example frame format of the wireless ANQP request message 230 that includes a BSS query originated by the wireless device (STA) that is unassociated to the access point device, requesting information on candidate wireless networks, in accordance with at least one embodiment of the present invention. Note that the format of the ANQP request message 230 is the same as the format for the ANQP request message 130 of FIG. 3A, so that the same type of ANQP query is used for both associated STAs, as well as unassociated STAs.

Figure 4B:
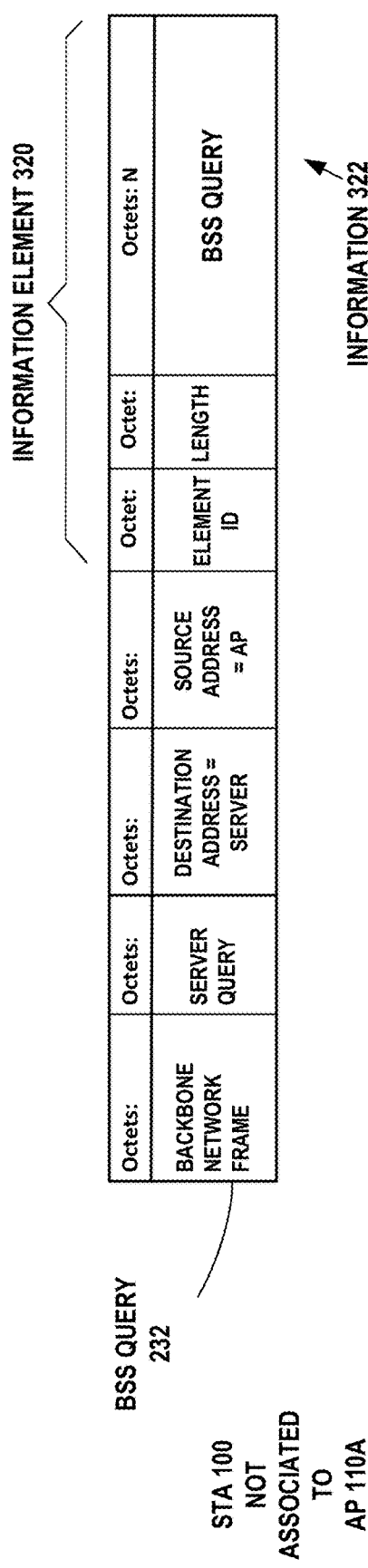
FIG. 4B illustrates an example frame format of the backbone network frame for the BSS query forwarding message transmitted by the access point transmitting the to the ANQP server, including the BSS query originated by the wireless device (STA), and which does not include any indication of whether the wireless device is or is not associated with the access point, in accordance with at least one embodiment of the present invention.

FIG. 4B illustrates an example frame format of the backbone network frame for the BSS query forwarding message 232 transmitted by the access point transmitting the to the ANQP server, including the BSS query originated by the wireless device (STA), and which does not include any indication of whether the wireless device is or is not associated with the access point, in accordance with at least one embodiment of the present invention. The ANQP server 120 receives the BSS query forwarding message 232 and does not read any indication of whether the wireless device is or is not associated with the access point. Without any such indication, the ANQP server 120 assumes that the wireless device 100 is not associated with the access point 110A, and thus processes the request accordingly.

Figure 4C:
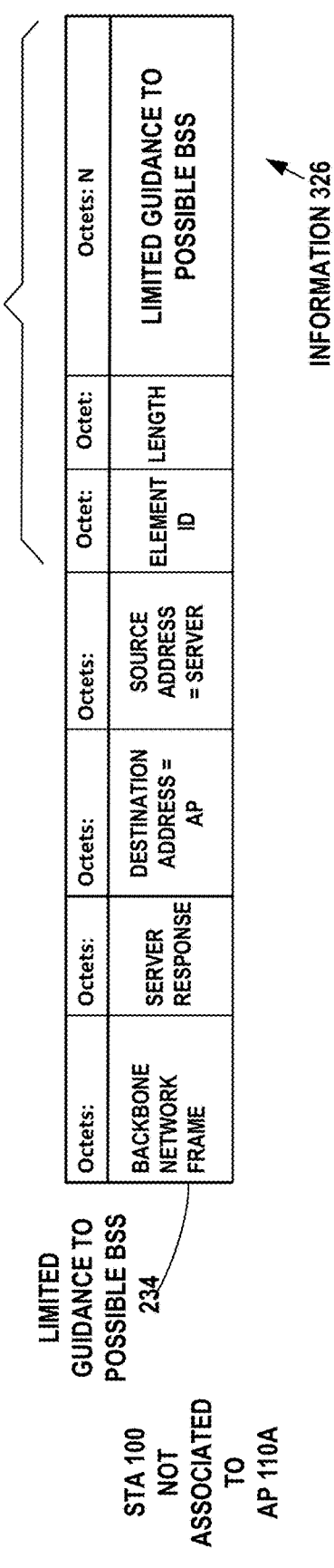
FIG. 4C illustrates an example frame format of the backbone network frame for the minimal or limited guidance to possible BSS message concerning candidate wireless networks, in response to the BSS query originated by the wireless device (STA) that is unassociated to the access point device, in accordance with at least one embodiment of the present invention.

FIG. 4C illustrates an example frame format of the backbone network frame for the minimal or limited guidance to possible BSS message 234 concerning candidate wireless networks, in response to the BSS query originated by the wireless device (STA) that is unassociated to the access point device, in accordance with at least one embodiment of the present invention.

Figure 4D:
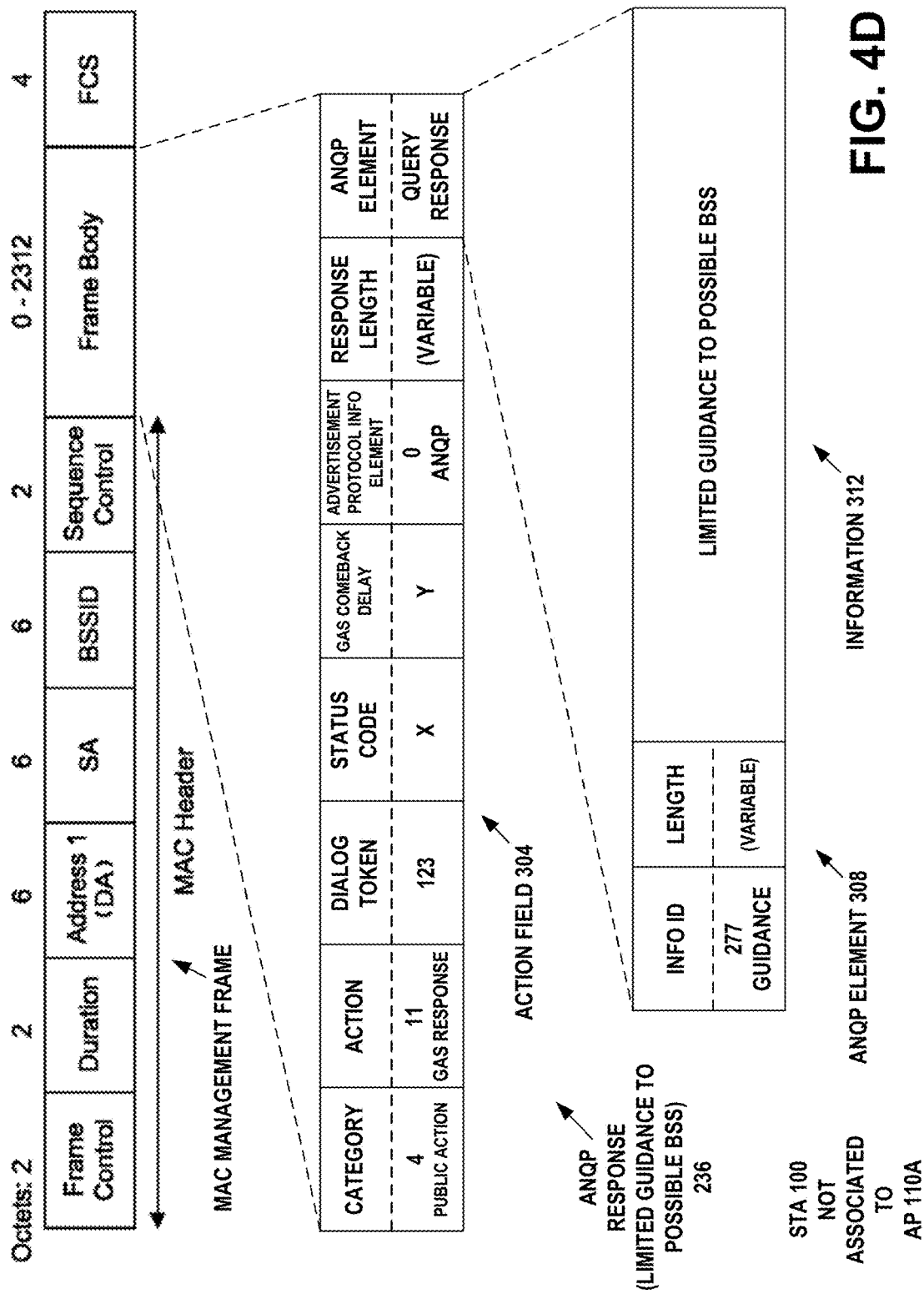
FIG. 4D illustrates an example frame format of the wireless ANQP response message that includes the minimal or limited guidance to possible BSS message concerning candidate wireless networks, in response to the BSS query originated by the wireless device (STA) that is unassociated to the access point device, in accordance with at least one embodiment of the present invention.

FIG. 4D illustrates an example frame format of the wireless ANQP response message 236 that includes the minimal or limited guidance to possible BSS message concerning candidate wireless networks, in response to the BSS query originated by the wireless device (STA) that is unassociated to the access point device, in accordance with at least one embodiment of the present invention. Note that the format of the ANQP response message 236 is the same as the format for the ANQP request message 136 of FIG. 3D, so that the same type of ANQP response is used for both associated STAs, as well as unassociated STAs.

Figure 5A:
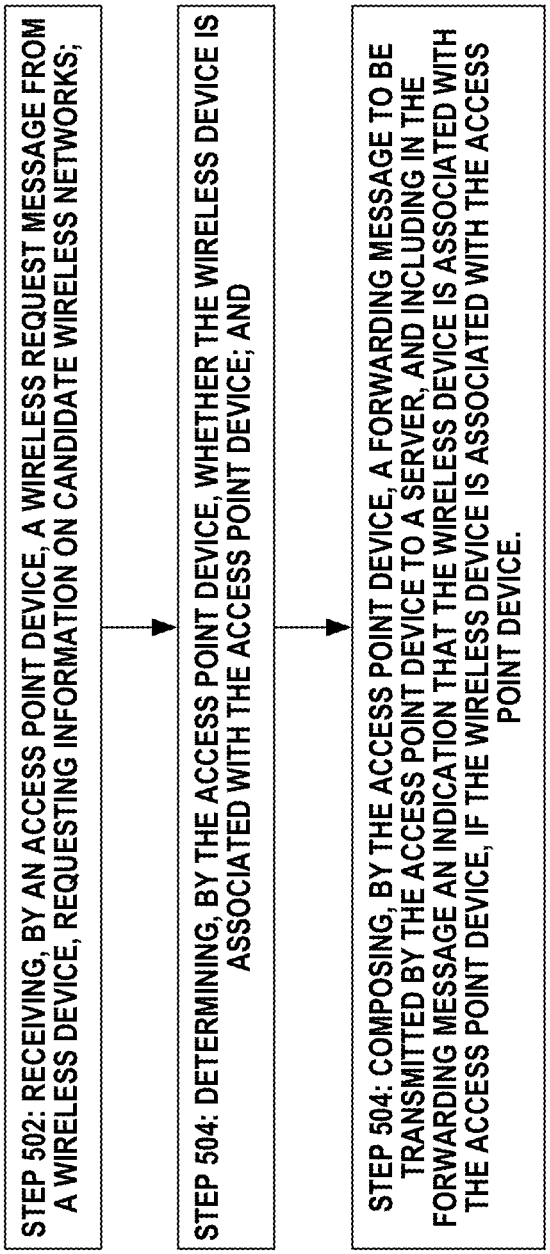
FIG. 5A illustrates an example flow diagram of operational steps in the access point device, in accordance with at least one embodiment of the present invention.

FIG. 5A illustrates an example flow diagram 500 of operational steps in the access point (AP) 110A, in accordance with at least one embodiment of the present invention. The steps of the flow diagram represent computer code instructions stored in the device's RAM and/or ROM memory, which when executed by the device's central processing units (CPU), carry out the functions of the example embodiments of the invention. The steps may be carried out in another order than shown and individual steps may be combined or separated into component steps. The flow diagram has the following steps:

Step 502: receiving, by an access point device, a wireless request message from a wireless device, requesting information on candidate wireless networks;

Step 504: determining, by the access point device, whether the wireless device is associated with the access point device; and Step 504: composing, by the access point device, a forwarding message to be transmitted by the access point device to a server, and including in the forwarding message an indication that the wireless device is associated with the access point device, if the wireless device is associated with the access point device.

FIG. 5B illustrates an example flow diagram 550 of operational steps in the ANQP server 120, in accordance with at least one embodiment of the present invention. The steps of the flow diagram represent computer code instructions stored in the device's RAM and/or ROM memory, which when executed by the device's central processing units (CPU), carry out the functions of the example embodiments of the invention. The steps may be carried out in another order than shown and individual steps may be combined or separated into component steps. The flow diagram has the following steps:

Step 552: receiving, by a server, a forwarding message from an access point device, including an indication whether a wireless device is associated with the access point device, the access point device having received from the wireless device, a wireless request message requesting information on candidate wireless networks;

Step 554: accessing, by the server, information on available wireless networks in response to the forwarding message, if the forwarding message included an indication that the wireless device is associated with the access point device; and Step 556: transmitting, by the server, a response message to the access point device, the response message including identifications of one or more candidate wireless networks, in response to the forwarding message, if the forwarding message included an indication that the wireless device is associated with the access point.

Figure 6:
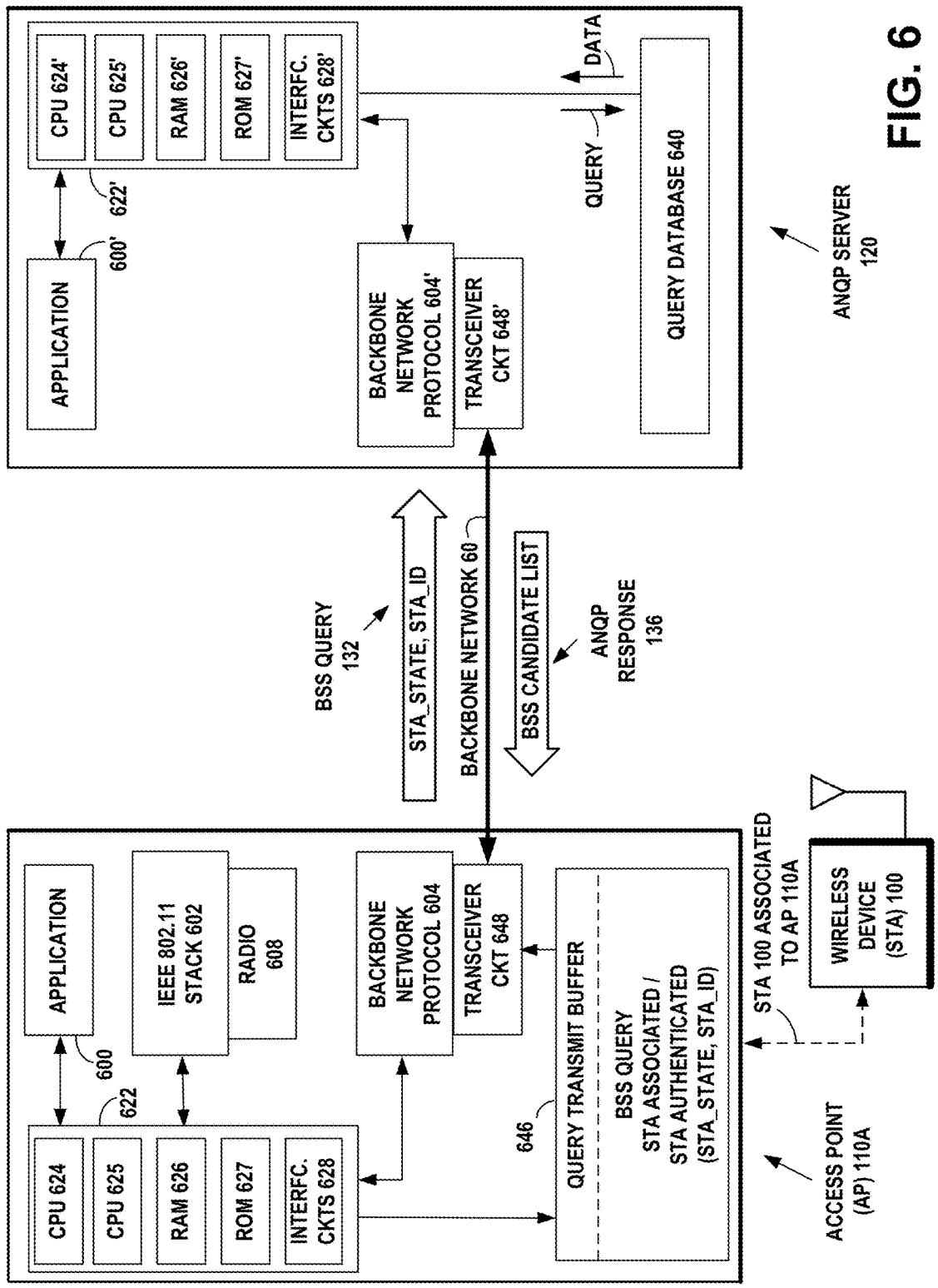
FIG. 6 illustrates an example network diagram and functional block diagram of the access point device and the ANQP server, in accordance with at least one embodiment of the present invention.

FIG. 6 illustrates an example network diagram and functional block diagram of the access point device 110A and the ANQP server 120, in accordance with at least one embodiment of the present invention. The example access point device 110A may include a processor 622 that may include at least one of the following: a dual or multi-core central processing unit CPU 624 and CPU 625, a RAM memory 626, a ROM memory 627, and an interface 628 for a keypad, display, and other input/output devices. The example access point device 110A may include a WLAN protocol stack 602, including the IEEE 802.11 MAC, for communication over the network, and WLAN transceiver 608. The WLAN protocol stack may also include an application program 600. A query transmit buffer 646 buffers the query in the BSS query message 132. The backbone network frame for the BSS query forwarding message 132 is assembled by the backbone network protocol 604 and is transmitted by the transceiver circuit 648 over the backbone network 60 to the ANQP server 120. The wireless device STA 100 is shown associated to the access point 110A, so the query transmit buffer 646 buffers the BSS query, with the indication that the STA is associated with the access point, and the STA ID.

The example ANQP server 120, may include a processor 622' that may include at least one of the following: a dual or multi-core central processing unit CPU 624' and CPU 625', a RAM memory 626', a ROM memory 627', and an interface 628' for a keypad, display, and other input/output devices. The example ANQP server 120 may include a backbone network protocol 604' and transceiver circuit 648' connected to the backbone network 60 to receive the BSS query forwarding message 132. The ANQP server 120 may also include an application program 600'. The query database 640 may be integral with the ANQP server 120 or it may be located remotely from the ANQP server 120. The figure shows the ANQP server 120 transmitting a BSS candidate list response message 134 over the backbone network 60 to the access point device 110A.

Figure 7:
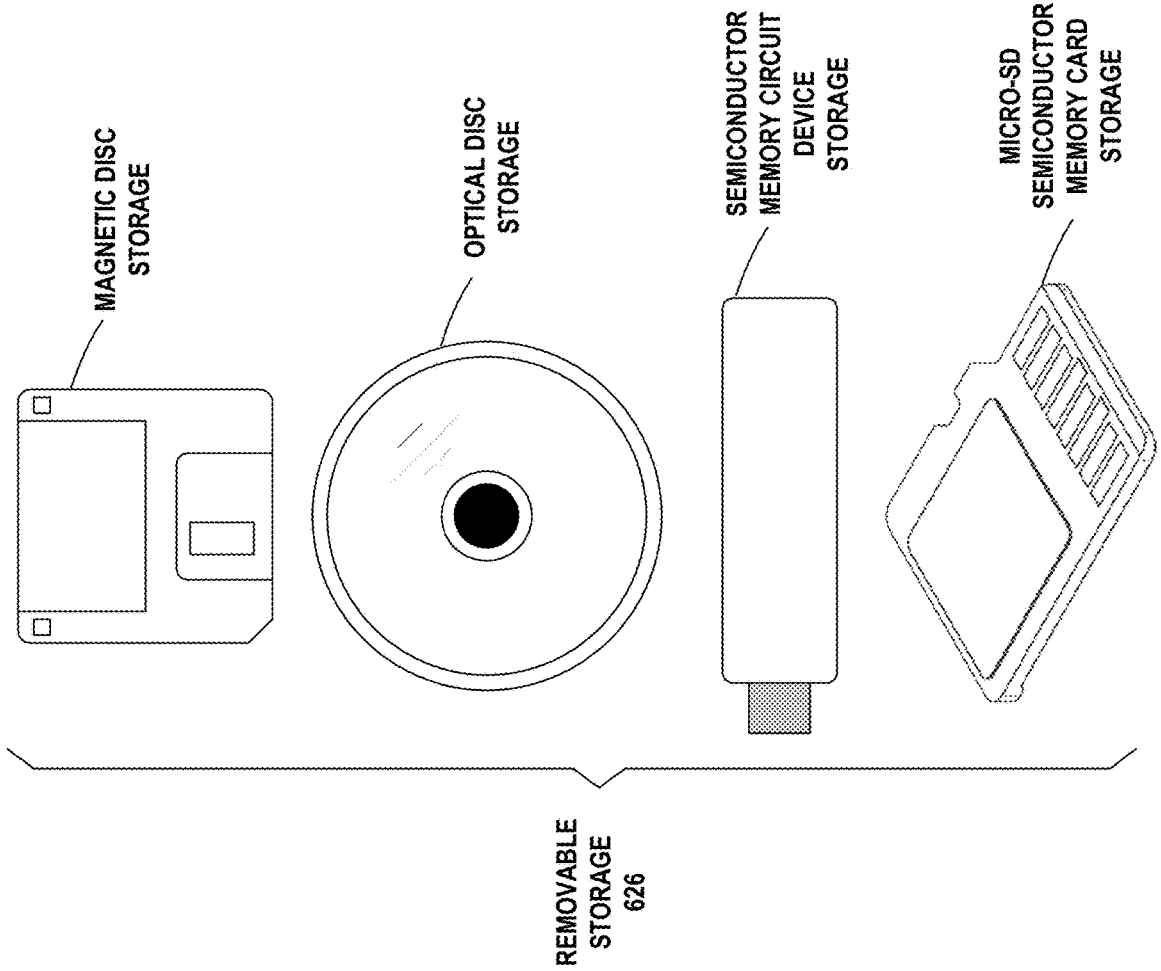
FIG. 7 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with an example embodiment of the invention.

In an example embodiment, both the access point device 110A and the ANQP server 120 may include interface circuits that interface with one or more radio transceivers, battery and other power sources, key pad, touch screen, display, microphone, speakers, ear pieces, camera or other imaging devices, etc. The RAM and ROM may be removable memory devices 626 such as smart cards, SIMs, WIMs, semiconductor memories such as RAM, ROM, PROMS, flash memory devices, etc. The processor protocol stack layers, and/or application program may be embodied as program logic stored in the RAM and/or ROM in the form of sequences of programmed instructions which, when executed in the CPU, carry out the functions of example embodiments. The program logic may be delivered to the writeable RAM, PROMS, flash memory devices, etc. from a computer program product or article of manufacture in the form of computer-usable media such as resident memory devices, smart cards or other removable memory devices. Alternately, they may be embodied as integrated circuit logic in the form of programmed logic arrays or custom designed application specific integrated circuits (ASIC). The one or more radios in the device may be separate transceiver circuits or alternately, the one or more radios may be a single RF module capable of handling one or multiple channels in a high speed, time and frequency multiplexed manner in response to the processor. An example of removable storage media 626, as shown in FIG. 7, may be based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

FIG. 9 illustrates an example embodiment of the invention, wherein examples of removable storage media 626 are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with an example embodiment of the invention.

What is claimed is:

1. A method, comprising:
   receiving, by an access point device, a wireless request message from a wireless device, requesting information on candidate wireless networks;
   determining, by the access point device, whether the wireless device is associated with the access point device; and
   composing, by the access point device, a forwarding message to be transmitted by the access point device to a server, and including in the forwarding message an indication that the wireless device is associated with the access point device, when the wireless device is associated with the access point device.

2. The method of claim 1, further comprising:
   receiving, by the access point device, a response message from the server, the response message including identifications of one or more candidate wireless networks, when the forwarding message included the indication that the wireless device is associated with the access point device; and
   transmitting, by the access point device to the wireless device, the identifications of one or more candidate wireless networks from the received response message.

3. The method of claim 2, wherein the response message includes an indication of which candidate wireless network offers a best wireless connection for the wireless device.

4. The method of claim 1, further comprising:
   receiving, by the access point device, a response message from the server, the response message including minimal guidance to possible candidate wireless networks, when the forwarding message does not included an indication that the wireless device is associated with the access point device; and
   transmitting, by the access point device, information from the received response message, to the wireless device.

5. The method of claim 1, further comprising:
   determining, by the access point device, whether the wireless device is authenticated with the access point device; and
   including, by the access point device, in the forwarding message, an identification of the wireless device and an indication whether the wireless device is authenticated with the access point device.

6. The method of claim 1, wherein the server is an access network query protocol server.

7. The method of claim 1, wherein the forwarding message further includes at least one of a MAC address of the wireless device and a subscription identifier related to the wireless device.

8. The method of claim 1, wherein the forwarding message further includes at least one of a MAC address of the wireless device and a subscription identifier related to the wireless device.

9. An apparatus, comprising:
   at least one processor;
   at least one memory including computer program code;
   the at least one memory and the computer program code configured to, with the at least one processor, cause the apparatus at least to:
   receive a wireless request message from a wireless device, requesting information on candidate wireless networks;
   determine whether the wireless device is associated with the apparatus; and
   compose a forwarding message to be transmitted by the apparatus to a server, and including in the forwarding message an indication that the wireless device is associated with the apparatus, when the wireless device is associated with the apparatus.

10. The apparatus of claim 9, further comprising:
    the at least one memory and the computer program code configured to, with the at least one processor, cause the apparatus at least to:
    receive a response message from the server, the response message including identifications of one or more candidate wireless networks, when the forwarding message included the indication that the wireless device is associated with the apparatus; and
    transmit to the wireless device, the identifications of one or more candidate wireless networks from the received response message.

11. A computer program product comprising computer executable program code recorded on a computer readable non-transitory storage medium, the computer executable program code comprising:
    code for receiving, by an access point device, a wireless request message from a wireless device, requesting information on candidate wireless networks;
    code for determining, by the access point device, whether the wireless device is associated with the access point device; and
    code for composing, by the access point device, a forwarding message to be transmitted by the access point device to a server, and including in the forwarding message an indication that the wireless device is associated with the access point device, when the wireless device is associated with the access point device.

12. A method, comprising:
    receiving, by a server, a forwarding message from an access point device, including an indication whether a wireless device is associated with the access point device, the access point device having received from the wireless device, a wireless request message requesting information on candidate wireless networks;
    accessing, by the server, information on available wireless networks in response to the forwarding message, when the forwarding message included an indication that the wireless device is associated with the access point device; and
    transmitting, by the server, a response message to the access point device, the response message including identifications of one or more candidate wireless networks, in response to the forwarding message, when the forwarding message included an indication that the wireless device is associated with the access point device.

13. The method of claim 12, further comprising:
transmitting, by the server, a response message to the access point, the response message listing candidate networks based on load balancing among the available networks, when the forwarding message included the indication that the wireless device is associated with the access point device.

14. The method of claim 12, further comprising:
transmitting, by the server, a response message to the access point, the response message including minimal guidance to possible candidate wireless networks, when the forwarding message does not included an indication that the wireless device is associated with the access point device.

15. The method of claim 12, further comprising:
receiving, by the server, in the forwarding message, an identification of the wireless device and an indication whether the wireless device is authenticated with the access point device.

16. The method of claim 12, wherein the server is an access network query protocol server.

17. The method of claim 12, wherein the response message includes an indication of which candidate wireless network offers a best wireless connection for the wireless device.

18. An apparatus, comprising:
at least one processor;
at least one memory including computer program code;
the at least one memory and the computer program code configured to, with the at least one processor, cause the device at least to:
receive a forwarding message from an access point device, including an indication whether a wireless device is associated with the access point device, the access point device having received from the wireless device, a wireless request message requesting information on candidate wireless networks;
access information on available wireless networks in response to the forwarding message, when the forwarding message included an indication that the wireless device is associated with the access point device; and
transmit a response message to the access point device, the response message including identifications of one or more candidate wireless networks, in response to the forwarding message, when the forwarding message included an indication that the wireless device is associated with the access point device.

19. The apparatus of claim 18, further comprising:
the at least one memory and the computer program code configured to, with the at least one processor, cause the device at least to:
transmit a response message to the access point, the response message including identifications of one or more available wireless networks, when the forwarding message included the indication that the wireless device is associated with the access point device.

20. A computer program product comprising computer executable program code recorded on a computer readable, non-transitory storage medium, the computer executable program code, when executed by a computer processor, comprising:
code for receiving, by a server, a forwarding message from an access point device, including an indication whether a wireless device is associated with the access point device, the access point device having received from the wireless device, a wireless request message requesting information on candidate wireless networks;
code for accessing, by the server, information on available wireless networks in response to the forwarding message, when the forwarding message included an indication that the wireless device is associated with the access point device; and
code for transmitting, by the server, a response message to the access point device, the response message including identifications of one or more candidate wireless networks, in response to the forwarding message, when the forwarding message included an indication that the wireless device is associated with the access point device.

* * * * *